US007222291B2

(12) United States Patent
Estrada et al.

(10) Patent No.: US 7,222,291 B2
(45) Date of Patent: May 22, 2007

(54) METHOD AND SYSTEM FOR IMPORTING HTML FORMS

(75) Inventors: Julio Estrada, Carlisle, MA (US); Maurice B. Shore, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 09/752,121

(22) Filed: Dec. 29, 2000

(65) Prior Publication Data

US 2002/0152234 A1 Oct. 17, 2002

(51) Int. Cl.
*G06F 17/00* (2006.01)

(52) U.S. Cl. .................. 715/501.1; 715/505; 715/507; 715/513; 709/201; 709/204

(58) Field of Classification Search ............. 715/501.1, 715/505, 506, 507, 508, 513, 522; 709/201, 709/204, 206, 230

See application file for complete search history.

(56) References Cited

U.S. PATENT DOCUMENTS

| 5,704,029 | A | * | 12/1997 | Wright, Jr. ................. 715/505 |
| 5,894,554 | A | | 4/1999 | Lowery et al. ........ 395/200.33 |
| 5,923,845 | A | * | 7/1999 | Kamiya et al. ............. 709/206 |
| 5,956,736 | A | * | 9/1999 | Hanson et al. ............. 715/513 |
| 6,052,730 | A | | 4/2000 | Felciano et al. ............ 709/225 |
| 6,070,185 | A | | 5/2000 | Anupam et al. ............ 709/204 |
| 6,081,788 | A | | 6/2000 | Appleman et al. ............ 705/14 |
| 6,233,600 | B1 | * | 5/2001 | Salas et al. ................. 709/201 |
| 6,278,449 | B1 | | 8/2001 | Sugiarto et al. ............ 345/334 |
| 6,317,777 | B1 | | 11/2001 | Skarbo et al. ............. 709/204 |
| 6,343,302 | B1 | * | 1/2002 | Graham ................... 715/501.1 |
| 6,418,446 | B1 | * | 7/2002 | Lection et al. .......... 707/103 R |
| 6,460,041 | B2 | * | 10/2002 | Lloyd .......................... 707/10 |
| 6,560,607 | B1 | * | 5/2003 | Lassesen .................... 707/101 |
| 6,574,631 | B1 | * | 6/2003 | Subramanian et al. ...... 707/101 |
| 6,581,061 | B2 | * | 6/2003 | Graham ....................... 707/10 |
| 6,640,241 | B1 | * | 10/2003 | Ozzie et al. ................ 709/204 |
| 6,665,685 | B1 | * | 12/2003 | Bialic .......................... 707/102 |
| 6,772,216 | B1 | * | 8/2004 | Ankireddipally et al. ... 709/230 |
| 6,779,153 | B1 | * | 8/2004 | Kagle ......................... 715/522 |
| 6,917,962 | B1 | * | 7/2005 | Cannata et al. ............ 709/204 |
| 6,918,084 | B1 | * | 7/2005 | Slaughter et al. ........... 715/513 |
| 6,968,500 | B2 | * | 11/2005 | Mikhailov et al. .......... 715/505 |
| 2001/0054046 | A1 | * | 12/2001 | Mikhailov et al. .......... 707/500 |

OTHER PUBLICATIONS

Pankoke-Babatz et al., "Collaborative Workspace for Time Deferred Electronic Cooperation", Nov. 16-19, 1997, ACM, pp. 187-196.*
Wang,1999,"Team- and Role-based Organizational COntext and Access Control for Cooperative Hypermedia Environments", Hypertext 1999, ACM, pp. 37-46.*
Haake et al., "Flexible Support for Business Processes: Extending Cooperative Hypermedia with Process Support", Nov. 16-19, 1997, ACM, pp. 341-350.*
Wang et al.,"Flexible Coordination with Cooperative Hypermedia", Jun. 20-26, 1998, ACM, pp. 245-255.*
Cohen et al.,"Designing to Support Adversarial Collaboration", Dec. 2-6, 2000, ACM, pp. 31-39.*

* cited by examiner

*Primary Examiner*—Heather R. Herndon
*Assistant Examiner*—James H Blackwell

(57) ABSTRACT

Collaboration space object model provides for a place consisting of rooms created by users interacting with a client browser. A skin (i.e., theme) may be used as template for creating places. PlaceBots (i.e., agents) provide for accessing, processing and managing data in a place. HTML may be dragged and dropped into a place, where it is parsed and corresponding place fields created. MS Excel or Word documents may be dragged and dropped into a place, which creates a corresponding form, and users may create new documents using that form. A place type comprising a template of an entire place, or collaboration space, may be used to create new places. Changes made to a place may be reported, subject to security controls, by selecting what's new. Task fields are provided allowing web browser creation of forms for work flow. Place enabled objects are provided for synchronous communications. A quick browse feature provides a simplified format for browser windows based on selection of HTML links. MS Office documents may launched within a place for in place editing and importing the resulting document into the place.

4 Claims, 25 Drawing Sheets

QUICKPLACE

| FILE | EDIT | VIEW | FAVORITES | TOOLS | HELP |

| * * * | HOME | SEARCH | * * * | MAIL | PRINT | //EDIT// | DISCUSS |

LINKS ☐ HAIKUTEAM  ☐ QUICKPLACE-1  ☐ QUICKPLACE-QUICKPLACE

HOME:     NEW:

WHAT DO YOU LIKE TO CREATE?
- ⦿ PAGE. CHOOSE THIS TO CREATE A NEW PAGE THAT CAN INCLUDE RICH FORMATTED, TEXT IMAGES, AND FILE ATTACHMENTS.
- ○ IMPORTED PAGE. CHOOSE THIS TO CREATE A NEW PAGE USING THE CONTENTS OF AN EXISTING FILE THAT IS ON YOUR COMPUTER.
- ○ CALENDAR PAGE. CHOOSE THIS TO CREATE A NEW CALENDAR ENTRY.
- 416 ──○ MICROSOFT WORD 2000 PAGE. CHOOSE THIS TO CREATE A PAGE USING WORD 2000.
- ○ MICROSOFT POWERPOINT 2000 PAGE. CHOOSE THIS TO CREATE A PAGE USING POVERPOINT 2000.
- ○ ALL DAY EVENT
- 414 ──○ STATUS REPORT. PLEASE USE THIS FOR WEEKLY STATUS REPORTS.
- ○ ACTION ITEM

412

CLICK THE NEXT BUTTON BELOW WHEN YOU ARE FINISHED FILLING OUT THIS FORM.

418 ──[ NEXT ]   [ BACK ]

ADDRESS: http://quickplace.iris.com/QuickPlace/presentation/main.nsf?openDB&Login HOME
PRESENTATION
WELCOME
WHAT IS QP
ARCHITECTURE
INSTALL
ADMIN
OFFLINE
SERVER
CLIENT
BUILD PROCESS
TROUBLESHOOT
TOOLS
INDEX

CUSTOMIZE

SECURITY

— 346

NEW FORM
WHAT IS THE TITLE OF THIS FORM?

FIELDS. WHAT FIELDS WOULD YOU LIKE TO INCLUDE — 442
IN THIS FORM?

ADD...
MODIFY...
REMOVE...
RECORDER...

TITLE

WORKFLOW. DO YOU WANT PAGES CREATED WITH THIS
FORM TO BE REVIEWED BEFORE BEING PUBLISHED? — 432
MODIFY... STANDARD WORKFLOW
BASED ON A MICROSOFT OFFICE OR LOTUS SMARTSWEET
DOCUMENT. CHOOSE AN OFFICE OR SMARTSWEET DOCUMENT
TO USE FOR EDITING PAGES CREATED WITH THIS FORM.

434

X — 436
SCHEDULE.XLS

DO YOU WANT PAGES CREATED WITH THIS FORM TO
ALWAYS BE PLACED IN A SPECIFIC FOLDER?

- NO SPECIFIC FOLDER - ▼ — 444

YOU CAN OPTIONALLY PROVIDE A FULLER DESCRIPTION 446
OF THE FORM:

CLICK THE DONE BUTTON BELOW WHEN YOU ARE FINISHED
FILLING OUT THIS FORM.

448 — DONE    CANCEL

TASK FIELD GROUP - READ SCENE STATE
CHARLIE  10/18/00  9 :42 A.M.

THIS IS THE READ SCENE STATE FOR TASKS THAT
ARE NOT MILESTONES :

TASK INFORMATION :

ASSIGNED TO :            CATHY
    STATUS :                IN COMPLETE
    DUE DATE :              12/23/00
    START DATE :           12/22/00
    CATEGORY :             PROJECT X

WHO CAN EDIT THIS TASK :   CATHY, JULIO

FIG. 24

MILLENNIA
* WELCOME
* FOYER DISCUSSION
* MILLENA'S ROOM
* CAP MAN ROOM
* THE ROCK'S ROOM
* ACGUISITION CAL
* LIBRARY
* [CUSTOMIZE]
* MEMBERS

MERGERS_ ACQUISITIONS

BACK    NEXT    HELP

FORM WORKFLOW

WORKFLOW: BY SETTING THE WORKFLOW FOR A FORM, YOU CAN ROUTE PAGES TO SPECIFIC MEMBERS AND....AS THE PAGE IS BEING PUBLISHED

WHAT TYPE OF WORKFOLOW SHOULD THIS PAGE HAVE?

514 —— ◉ NO SPECIAL WORKFOLOW
515 —— ○ SIMPLE SUBMIT....
516 —— ○ EDITOR-IN-CHIEF....
517 —— ○ APPROVAL CYCLE....
518 —— ○ MULTIPLE EDITORS....

CLICK THE NEXT BUTTON BELOW WHEN YOU ARE FINISHED FILLING OUT THIS FORM.

[NEXT]

MILLENNIA | MERGERS_ACQUISITIONS
*
*
*

* CUSTOMIZE

| CANCEL | DONE | HELP |

NEW FORM  528
1  WHAT IS THE TITLE OF THIS FORM?

2  WHAT FIELDS WOULD YOU LIKE TO BE
   INCLUDED IN THIS FORM?

520 — ADD...
     MODIFY...
     REMOVE...
     REORDER...

3  WORKFLOW : DO YOU WANT PAGES      442
   CREATED WITH THIS FORM TO BE
   REVIEWED BEFORE BEING PUBLISHED?

526 — MODIFY...    STANDARD WORKFLOW

4  DO YOU WANT PAGES CREATED WITH THIS
   FORM TO BE PLACED IN A SPECIFIC FOLDER?

- NO SPECIFIC FOLDER - ▼
                                   444

5  YOU CAN OPTIONALLY PROVIDE A FULLER
   DESCRIPTION OF THIS FORM.         446

6  CLICK DONE BUTTON ABOVE WHEN YOU
   HAVE FINISHED FILLING THE FORM.

METHOD AND SYSTEM FOR IMPORTING HTML FORMS

CROSS REFERENCES TO RELATED APPLICATIONS

The following U.S. patent applications, filed concurrently herewith, are assigned to the same assignee hereof and contain subject matter related to the subject matter of the present application.

U.S. patent application Ser. No. 09/752,120, filed 29 Dec. 2000, entitled "Method and System for Creating a Theme of a Place to be Used as a Template for Other Places";

U.S. patent application Ser. No. 09/752,115, filed 29 Dec. 2000, entitled "Method and System for Automatically Accessing, Processing, and Managing the Data In a Place";

U.S. patent application Ser. No. 09/752,172, filed 29 Dec. 2000, entitled "Method and System for Importing MS Office Forms";

U.S. patent application Ser. No. 09/752,942, filed 29 Dec. 2000, entitled "Method and System for Creating a Place Type to Be Used as a Template for Other Places";

U.S. patent application Ser. No. 09/752,934, filed 29 Dec. 2000, entitled "Method and System for Identifying and Displaying Information That Is New or Has Been Updated In a Place";

U.S. patent application Ser. No. 09/752,961, filed 29 Dec. 2000, entitled "Method and System f or Providing Task Information in a Place";

U.S. patent application Ser. No. 09/752,745, filed 29 Dec. 2000, entitled "Method and System for Providing Synchronous Communication and Person Awareness In a Place";

U.S. patent application Ser. No. 09/752,962, filed 29 Dec. 2000, entitled "Method and System for Providing a Separate Browser Window With Information From the Main Window In a Simpler Format";

U.S. patent application Ser. No. 09/752,935, filed 29 Dec. 2000, entitled "Method and System for Allowing In Place Editing of Office Documents In a Place".

The present application is also an improvement upon the following copending, previously filed applications, assigned to the same assignee:

Ser. No. 09/473,745, filed 28 Dec. 1999, entitled "System and Method for Interconnecting Secure Rooms";

Ser. No. 09/473,630, filed 28 Dec. 1999, entitled "System and Method for Dynamic Management of Web Site";

Ser. No. 09/473,640, filed 28 Dec. 1999, entitled "System and Method for Presentation of Room Navigation";

Ser. No. 09/473,098, filed 28 Dec. 1999, entitled "System and Method for Independent Room Security Management";

Ser. No. 09/477,477, filed 4 Jan. 2000, entitled "System and Method for Dynamically Generating Viewable Graphics";

Ser. No. 09/477,471, filed 4 Jan. 2000, entitled "System and Method for Dynamic Browser Management of Web Site";

Ser. No. 09/477,474, filed 4 Jan 2000, entitled "System and Method for Room Decoration and Inheritance";

Ser. No. 09/477,469, filed 4 Jan. 2000, entitled "System and Method for Online/Off line Uninterrupted Updating of Rooms in Collaboration space";

Ser. No. 09/477,476, filed 4 Jan. 2000, entitled "System and Method for Client Replication of Collaboration Space";

Ser. No. 09/477,476, filed 4 Jan. 2000, entitled "System and Method for Browser Creation and Maintenance of Forms";

Ser. No. 09/478,238, filed 4 Jan. 2000, entitled "System and Method for Browser Definition of Workflow Documents".

The above-identified patent applications are incorporated herein by reference.

BACKGROUND OF THE INVENTION

1. Technical Field of the Invention

This invention relates to web technology. More particularly, it relates to the creation and use of collaboration sites on the Internet or on an Intranet client/server system and to the graphical user interface used in Internet communications.

2. Background Art

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

Collaboration requires simultaneous communication between individuals on a project team. Typically, this has required that the team members work in the same location. Phone and video conferencing has enabled some remote work on the part of team members. Also, because of the growth of the Internet, collaboration using web technologies has been attempted, primarily using electronic mail (E-mail), Internet chat rooms, electronic whiteboards, and conferencing software. The most useful has been E-mail, but this approach results in a large trail or thread of notes as collaboration on a project advances, and these notes have no home or place to reside which is accessible by all team members substantially instantaneously and simultaneously. People often enter such a thread at different points, and such threads are not efficient in coordinating the work of many different people on a team which may include in-house developers and others, such as remote contractors, outside of an enterprise's firewall.

In order for such disperse teams to have the same, or substantially the same, collaboration environment as individuals working in the same physical office, a system is required which facilitates instant messaging, voice conferencing, electronic white boarding, and text and non-text file exchange. Such a system needs to provide a collaborative electronic room, or space, which is easily configured for use by team members without substantial administrative or application development support, and preferably include both groupware and project oriented applications such as shared folders, file exchange, workflow, group calendars, threaded conversations, version control, file locking, file merging, and security.

There is a need in the art for such a system which is easy to set up and which enables diverse and remote teams to become immediately productive in a secure environment. It would be, further, most desirable to allow such a collaborative environment to be set up without administrative support, that is by members of the team itself, using a familiar and easy to use browser user interface. Members of the team, acting with manager or author authority, and using such a browser interface without involving administrative or application development support, need to be able to set up a folder or room for each project element, such as a source code component, with version control, workflow elements, and group calendaring for tracking the project or project element with respect to approvals and deadlines. Such a room needs to receive from team members reports and have them routed to appropriate team members for review, resolution, and approval.

The WWW is a collection of servers on an IP (Internet Protocol) network, such as the Internet, an Intranet or an Extranet, that utilize the Hypertext Transfer Protocol (HTTP). Hereinafter, "Internet" 100 will be used to refer to any IP network.

HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

It is an object of the invention to provide a collaboration space application model for creating web applications that are aesthetically pleasing and present the user with a simple interface.

It is a further object of the invention to provide for creating web applications that are instantly created, instantly archived, team and project oriented, easy to use, created, accessed and administered via the Web, reusable, and extensible.

It is a further object of the invention to provide an improved method and system for designers and consultants to incorporate into collaboration space custom features and data from other applications.

SUMMARY OF THE INVENTION

In accordance with the invention, a method and system is provided for incorporating a hypertext markup language (html) form into a collaboration space place by creating a form in html separate from the place; dragging and dropping the form into the place; parsing the form to identify each html field and process uniform resource locators; creating a field for each html tag; and saving on a page the html in read mode and the form in edit mode.

In accordance with an aspect of the invention, there is provided a computer program product or computer program element for incorporating a hypertext markup language (html) form into a collaboration space place by creating a form in html separate from the place; dragging and dropping the form into the place; parsing the form to identify each html field and process uniform resource locators; creating a field for each html tag; and saving on a page the html in read mode and the form in edit mode.

Other features and advantages of this invention will become apparent from the following detailed description of the presently preferred embodiment of the invention, taken in conjunction with the accompanying drawings.

BRIEF DESCRIPTION OF THE DRAWINGS

FIG. 10 is a schematic representation of a screen capture illustrating creation of a new page in accordance with a preferred embodiment of the invention.

FIG. 14 is a schematic representation of a screen capture illustrating the user interface for in Place editing of Microsoft documents.

FIG. 24 is a schematic representation of a read scene state display for tasks.

FIG. 25 is a schematic representation of a user interface for integrating a form into workflow.

FIG. 26 is a schematic representation of a user interface for adding events to a calendar page and for publishing it in a specific folder in collaboration space.

BEST MODE FOR CARRYING OUT THE INVENTION

Architecture Overview

Figure 1:
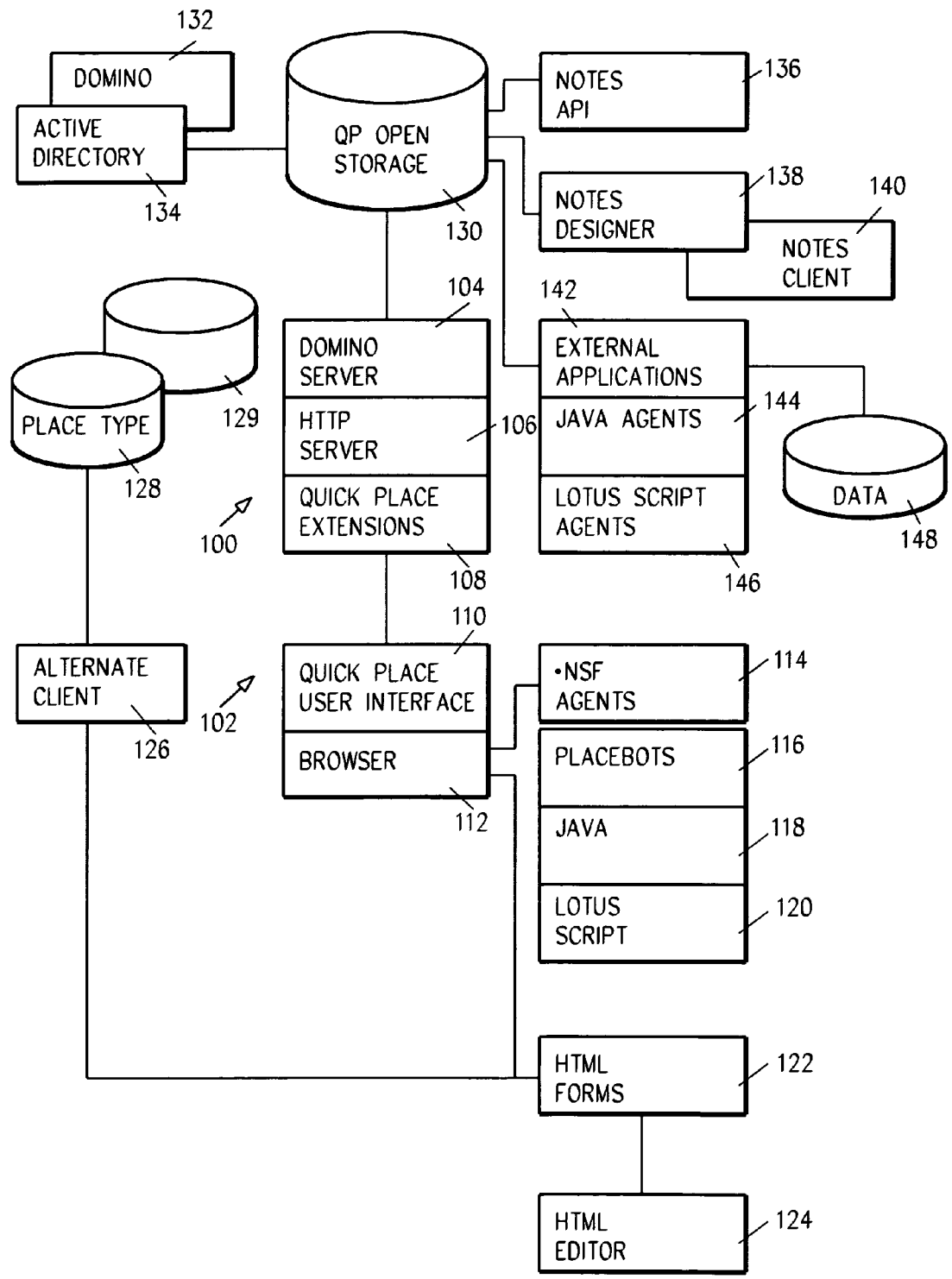
FIG. 1 is a schematic representation of a typical server/client system implementing the collaboration space of the preferred embodiments of the invention.

Referring to FIG. 1, a broad overview of a system implementing the collaboration space technology of an exemplary embodiment of the system of the invention is presented.

Server 100 includes a Domino server 104, HTTP server 106, QuickPlace extensions 108, and open storage 130. Client 102 includes a QuickPlace user interface 110 and browser 112.

QuickPlace open storage 130 includes all the databases and templates that implement the collaboration space. Domino 132 and active directory 134 define the collaboration process. The user interfaces with the system through browser 112 NSF agents 114, 116, Java 118 and LotusScript 120 represent components and templates downloaded from server 100 in support of collaboration space at client 102. All the extensions 108 are keyed off the uniform resource locator (URL), as will be further explained hereafter.

Notes API 136, Notes designer 138 and client 140, external applications 142, including Java agents 144 and LotusScript 146, are located off of open storage 130. Open storage 130 is storage where a document can be communicated, such that external applications 142 may manipulate it. QuickPlaces, pages, folders, can be created and changed, and data 148 can be imported and exported, using agents in Java 144 or LotusScript 146.

QuickPlace is primarily concerned with representing the collaboration space. Consequently, designers and consultants are able to integrate into that space custom features and data from other applications. HTML forms 122, written using an HTML editor 124, skins 248 (HTML 244 and QP tags), external files written using Java 118, and MS office documents 250 from MS office 228, may be imported to server 100 by dragging and dropping 111 from local storage 502 into an upload control panel 240 in browser 112.

An alternate client 126 and encapsulated place types 128 may be provided from which other spaces 129 can be created that take advantage of the QuickPlace storage model, providing functionality which can be manipulated using browser 112, including the integration of external technology providing opportunity for deep customization.

Server/Client Components

Figure 2:
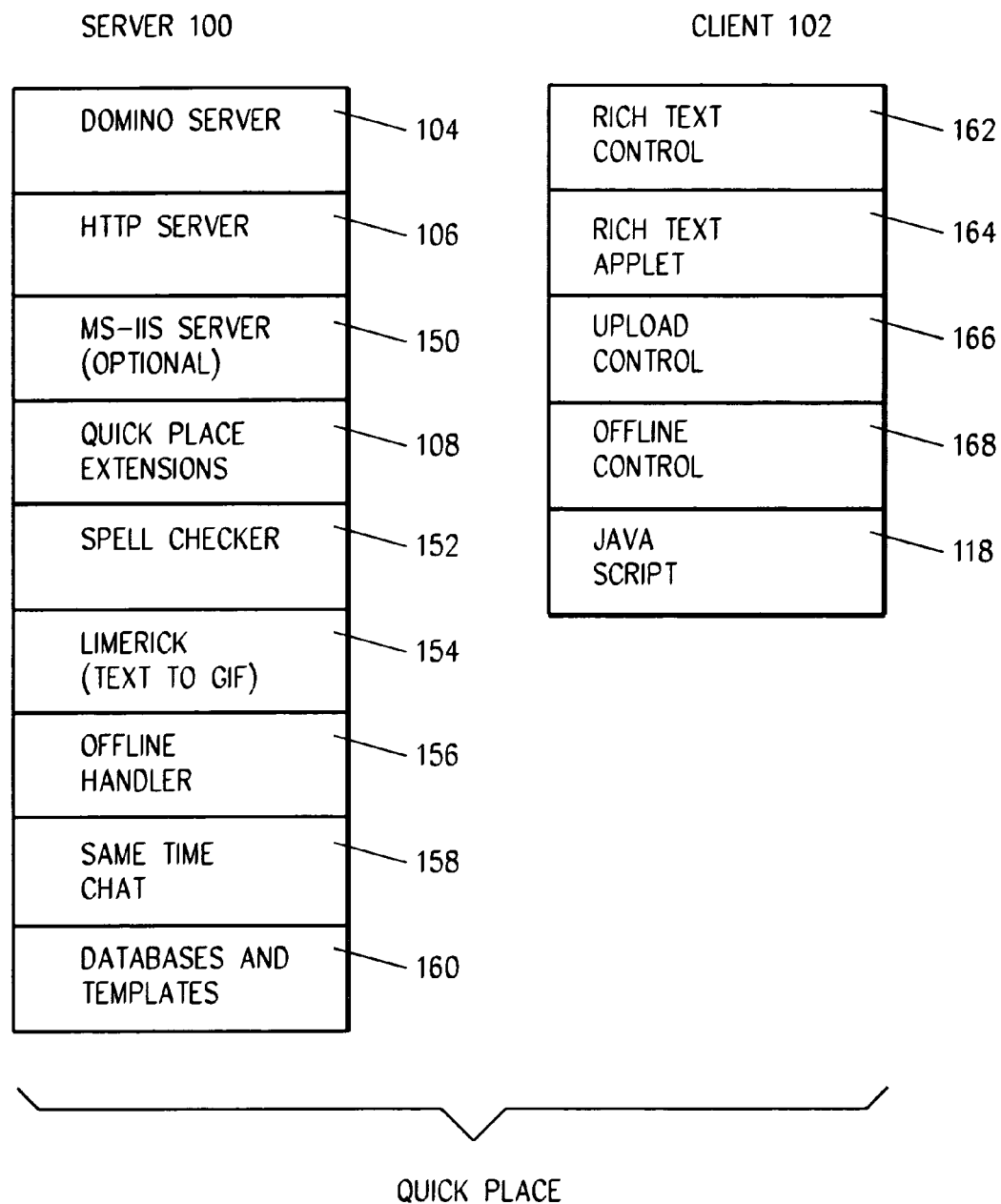
FIG. 2 is a schematic representation of various server and client components implementing the collaboration space of the preferred embodiments of the invention.

Referring to FIG. 2, in accordance with an exemplary embodiment of the invention, several components comprise QuickPlace server 100 and client 102.

QuickPlace is built on top of the Domino server 104. In the case of a stand alone installation, a subset of the Domino server is installed. Server 100 also includes HTTP server 106, or the optional MS IIS server 150. QuickPlace extension 108 is where we built most of the collaboration space implementing code exists the server 100. Server 100 also includes a spell checker 152 and a text to GIF converter (Limerick).

Client 102 includes rich text edit control 162, and applet 164 with which to apply various attributes and is a key component of the QuickPlace experience. Upload control 166 is used to attach and upload files, such as bringing in an agent and uploading it to a place. This is also used to bring in an imported HTML form or a different skin. Upload control is implemented to allow ease of use via drag and drop. Java script 118 includes code downloaded to the client to complete the generation of HTML pages.

Collaboration Space Object Model

Figure 3:
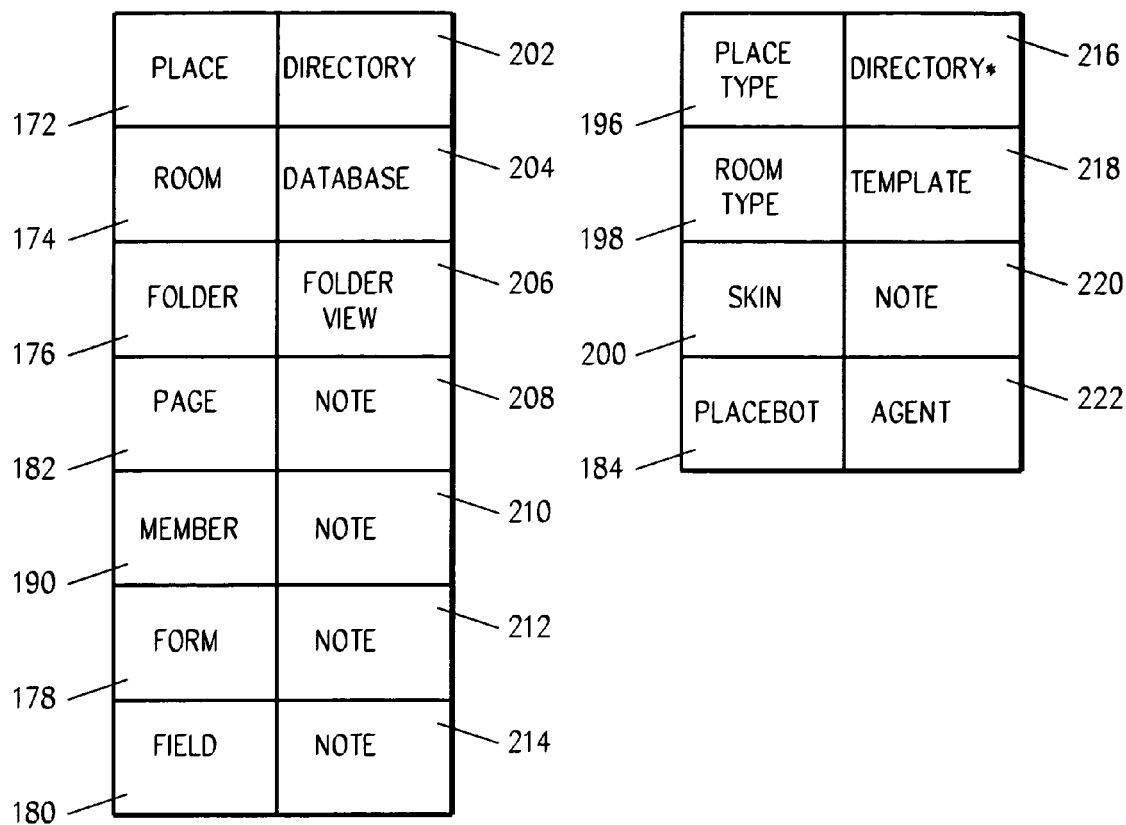
FIG. 3 is a schematic map illustrating Domino objects relating to the object model of the collaboration space of the preferred embodiments of the invention.

Referring to FIG. 3, the collaboration space of the preferred embodiment of the invention, referred to as QuickPlace, is implemented with an object model which comprises very few objects, very few concepts in order to make it easy to build and manage. And the fewer concepts, the better.

Referring to FIG. 3, the object model is independent of its implementation. There exists a place 172 that has rooms 174, and there are pages 182 in those rooms. And then there are members 190 of the place. Those four objects 172, 174, 182 and 190 are the primary objects.

Folders 176 add more complexity to the model, but bring a lot of benefit as well. Pages 182 are organized within folders. Two further objects are primarily visible to the designer of the place. And these are forms 178 and fields 180.

Figure 11:
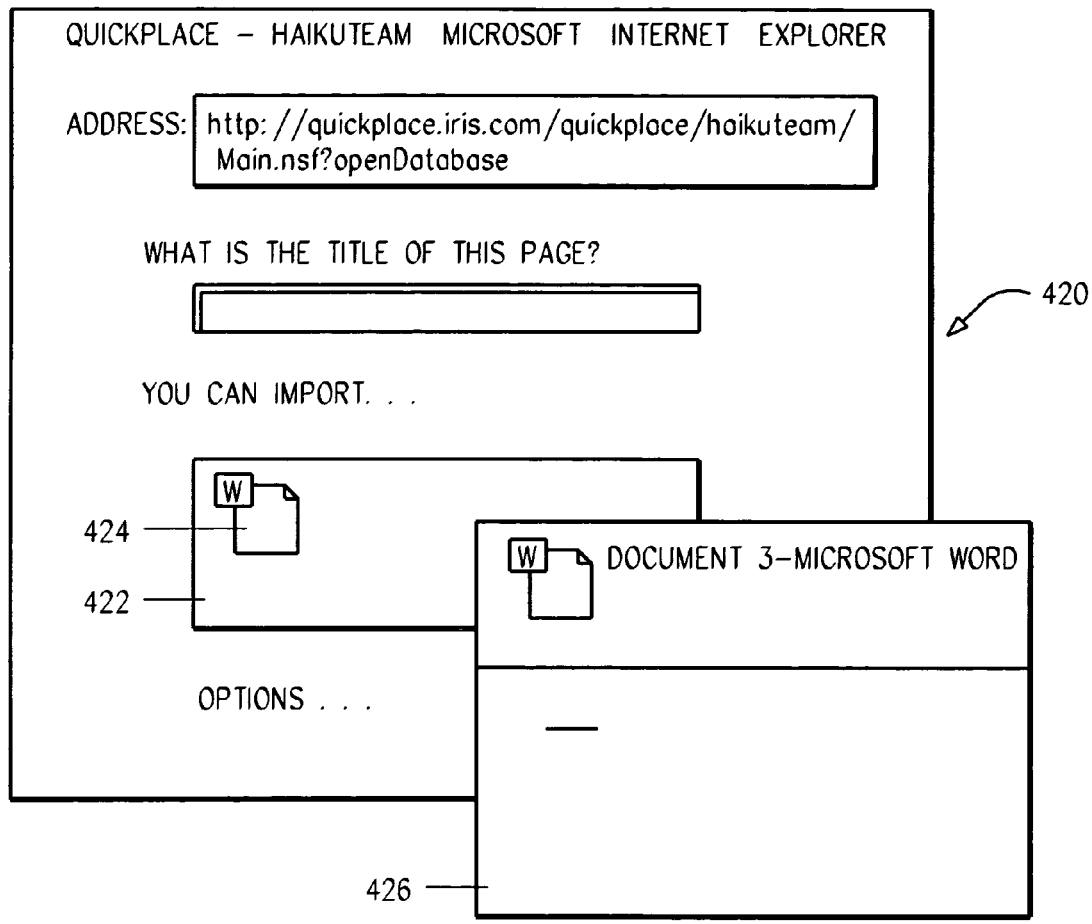
FIG. 11 is a schematic representation of a screen capture illustrating the user interface for creating a new page in collaboration space.

Place type 196 is a more advanced object, and is an object from which a place 172 is created. Place type 196 represents the foundation for building true collaborative applications. Everything created in building collaboration space is done in a place 172. Once such a place is created, it can be made a template 266 (FIG. 6) and copied as a place type 196. Once it becomes a place type 196, it is available for use by others for building additional places 172 that include the format, look and feel, and other characteristics of the original place. This is illustrated in FIG. 11, where a first place 360 is converted by QP extensions 108 into a place type, or template 364 from which additional places 366 may be created.

Room type 198 is an object provided for creating rooms 174 which are of a given type.

The last two objects illustrated in FIG. 3 are skins 200 and PlaceBots 184. Skins 200 control everything about the user interface, including layout and style. Layout defines the positioning of components on the screen. Style defines the form and colors of those components. A PlaceBot 184 is an enhanced agent, enhanced in the sense that it enables the use of Java or Lotus Notes or equivalent text editors. Once written using such an editor, and uploaded to a place 172, the server compiles the PlaceBot into an agent, reporting any errors. The agent resulting from a compiled PlaceBot can be scheduled to run at certain times, or upon opening a form. That is, the PlaceBot may be associated with a form, such as a sales order which, when opened, will cause the agent to execute. Thus, PlaceBots 184 are an essential part of building collaboration applications, for they are the primary repository for custom logic.

Referring further to FIG. 3, a preferred implementation of the object model heretofore described uses Lotus Notes/Domino concepts and objects. Thus, Notes/Domino file system directory 202 represents place 172; database 204 represents room 174; folder view 206 represents folder 176; pages 182, members 190, forms 178, fields 180 and skins 200 are represented by notes 208, 210, 212, 214, 220, respectively.

Place 172 is represented as a file system directory. So whenever a place called Acme is created, a file system directory 202 called Acme will be instantiated. Within that directory 202, there are a number of objects. Each room 174 is a Notes database 204. Folders 176 are implemented as Notes folders or views 206 depending on what's more convenient for the particular folder.

Pages 182 are a combination of data notes, forms and sub-forms 208. A member 190 is a data note 190 in a context room 174. Forms 178 and fields 180 are data notes. Place type 196 is a directory* 216 that contains all the rooms 174 that make up that place type. A room type 198 is a template 218. Skins 200 are a note 220 and PlaceBot 184 is an agent 222.

Notes/Domino Implementation of the Object Model

Developers familiar with the Domino Object Model (Domino OM) will be able to leverage their existing skills when developing on the QuickPlace platform. "PlaceBots" for example are implemented as Domino Agents, and it is possible to create and test them on Domino Databases. Within the QuickPlace object model (OM), however, there are some divergences from the Domino OM. For example, QuickPlace forms 178 are not the same as Domino Forms. QuickPlace forms more closely resemble Domino Documents, because they are created using a Domino form, and contain a Domino text field with a value of "h_Form". The value of "h_form" tells QuickPlace that this Domino document should be rendered in a browser as a QuickPlace form 178.

This structure provides flexibility for Web applications with less complexity than if Domino Forms were used. For example, in a default QuickPlace, a user can create a new QuickPlace form 178. The user chooses which fields to include in form 178, in what order they should appear and what text and or graphics should appear near them. To create this sort of instant structure on the Web using Domino Forms would be very complex indeed. QuickPlace has extended this concept of being able to use HTML to define forms 178 by enabling the creation of custom QuickPlace forms using imported HTML 122. These Forms not only make use of Web authoring technologies such as JavaScript, but also have the back end support of Domino. This back end logic is implemented via tools such as PlaceBots (Domino Agents) 184. This means that forms 178 have the ability to not only to define the look and feel of visible parts of an application, they also have the potential to initiate workflow and many other powerful automated features.

After a user has created a QuickPlace form, to put this form into action, this or some other user creates a page using this form. For example, an inventor may come into the place where this form is stored and address the form by the name given by the author. The QuickPlace system creates a page using the definition of the form which includes the field notes, the layout from the form note, and workflow attributes. A document is a type of note. Other types of notes are view, folder, agent and form. When user hits "done", browser sends a page with data to server which creates the resulting document. The page presented to the user by the server can be used by the user, who fills out the values for the fields. Thus, a document is created by a server from a browser entered page.

In accordance with a further object of the invention, a user can decide the appearance of an HTML form using an HTML editor and save to file. To make it a QuickPlace form, the HTML file is uploaded through a bucket, and the server converts it into a QuickPlace form. In this manner, externally designed HTML forms can be incorporated into a QuickPlace site. Once a form is a QuickPlace object, it has additional features. This form may then be offered to authors to create new documents. It is available in the room in which the user is operating, and can be adapted to workflow.

QuickPlace forms 178 have been optimized by stripping away many of the Notes features not required when used on the Web. A another advantage of this structure is that it enables the use of Web authoring tools to extend the objects. For example, with respect to QuickPlace forms, it is possible to modify forms using XML, JavaScript and HTML and any other Web tools. Knowledge of JavaScript and HTML are more common than Domino Designer skills, thus making the QuickPlace a very open platform. Some parts of the QuickPlace OM implement Domino/Notes functionality in different ways to a standard Domino application. For example, QuickPlace uses Domino's security and authentication model as a basis for its management of access to QuickPlaces. However, instead of primarily utilizing the Domino Directory, QuickPlace also uses a Contacts1.nsf database for each QuickPlace.

Containment and Association of Objects

Figure 4:
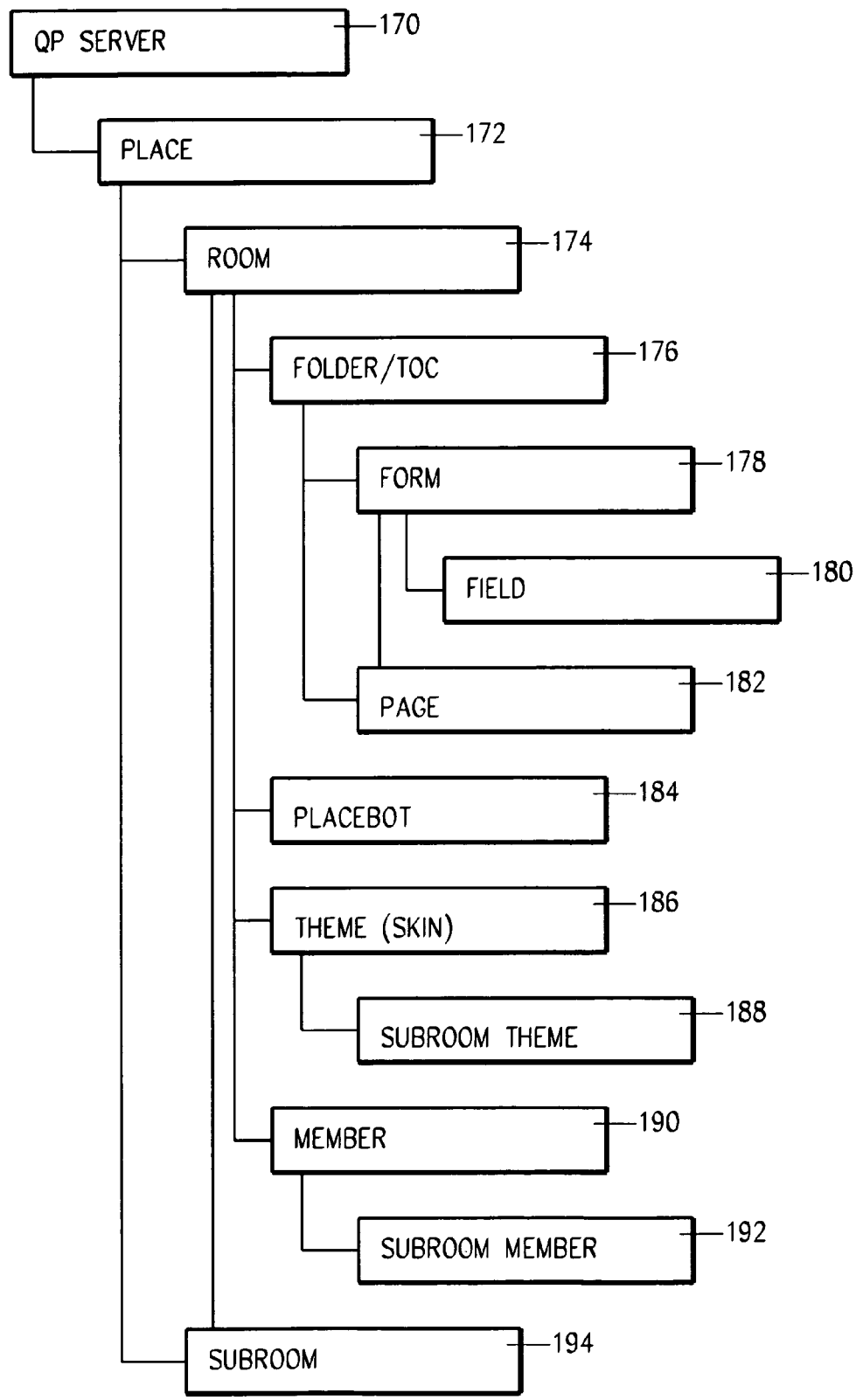
FIG. 4 is a schematic map of the object model implementing the collaboration space of the preferred embodiments of the invention.
Figure 5:
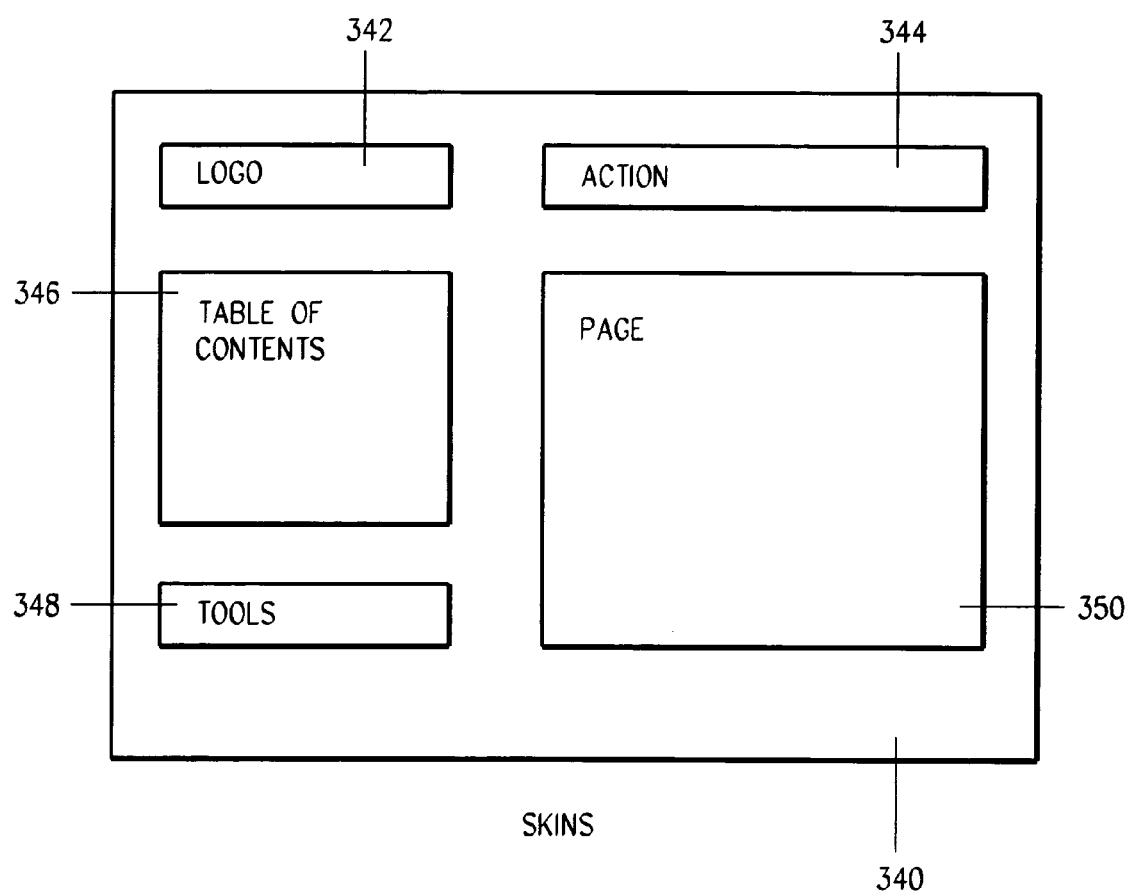
FIG. 5 illustrates the components of a collaboration space user interface.

Referring to FIG. 4, this object model is further described. FIG. 4 illustrates selected QuickPlace objects, the directory structure and how Objects relate to each other within the hierarchy. This model provides a visual representation of the containment and association between objects.

QuickPlace Server

The highest level of the model is the QuickPlace Server 170. Within server 170 are all of the QuickPlaces 172 as well as the resources they access to finally render Web applications.

This FIG. 4 displays the Model focusing on QuickPlaces. The following explanation, written from a programmers perspective, describes each of the objects of the model and they can be accessed in an application.

QuickPlace uses notes for many of its objects 182, 190, 178, 180 and 200, so that objects in the Place can be organized more easily. Table 1 sets forth the QP objects and their Notes/Domino equivalents. As an example of how design Notes are implemented consider the Table Of Contents (TOC). The Table Of Contents is a list of pages, folders and tools such as the Customize Area. Domino Folders may be listed using a link document, or Note.

TABLE 1

QUICKPLACE OBJECTS AND DOMINO EQUIVALENT

| QuickPlace Object | Domino Equivalent |
|---|---|
| QuickPlace Server | File Directory |
| Place | File Directory |
| Page | Data Note, Form & Subform |
| PlaceBot | Domino Agent |
| Theme | Data Note |
| Member | Data Note in Contacts1.nsf |
| Subroom * | NSF Database |
| SubroomTheme | Data Note |
| SubroomMember | Data Note in Contacts1.nsf |
| Room | NSF Database |
| Folder/TOC | Folder or View |
| Form | Data Note |
| Field | Data Note |

* Subrooms contain their own set of Folder, Page, Form, Field, PlaceBot & Subroom Objects QuickPlace Server 170 is a file directory containing all Places and Resources. The Domino equivalent is a file directory 202 named "quickplace". This identifies the main folder 176 for a QuickPlace server 170. If the QPServer 170 is running as a stand alone, this folder will be in the QuickPlace data folder. For example D:\QuickPlace\Data\quickplace.

If the QPServer 170 is running on top of a Domino server the folder will be the Domino Data folder. For example D:\Lotus\Domino\Data\quickplace.

To locate QuickPlace Server 170 in PlaceBots and get access to all of its databases, a LotusScript method GetDbServer is executed together with a test that the Path to databases starts with "QuickPlace".

Place Object

Place object 172 is a directory in the "QuickPlace" directory grouping resources for a Place. The Domino equivalent is a file directory bearing the name of the QuickPlace. Place object 172 is a directory that brings together a Place for organizational purposes. It also identifies the NSFs 114 as belonging to the place 172 by bearing the name of the QuickPlace. As distinguished from a place object 172, the main room 174 in a QuickPlace is a database called Main.nsf. Place object 172 groups and identifies the Main.nsf resources for the Place and any subrooms 194 in the Place. Place object 172 contains several files. There is a Main.nsf, Contacts1.nsf and a Search.nsf file. If the QuickPlace has a Subroom 194 there will also be an NSF file with its name starting with "PageLibrary". Each of these page library files is a Room 174.

The place object in PlaceBots 184: place object (directory) 172, contains the databases which form a place. When writing PlaceBots, one can search for this directory by using the name of the QuickPlace. In this directory will be found all the databases will belong to that place 172. This file directory's name is the name of the QuickPlace. For example, if the QuickPlace is called "Millennia", this directory has the following path within the QuickPlace server 170:

\millennia

To find the place object 172 for the Millennia Place in LotusScript the script procedure of Table 2 may be used:

TABLE 2

SCRIPT PROCEDURE FOR FINDING A PLACE

Dim ndbPlace As NotesDatabase
Set dirPlace = New NotesDbDirectory( g_sServerName )
Set ndbPlace = dirPlace.GetFirstDatabase( DATABASE )
sNdbPlaceFilepath = ndbPlace.FilePath
If Instr(1, Lcase( sNdbPlaceFilepath ),
|quickplace\millennia| ) Then
'//the Place is found Room Object Room object 174 is the main container for a Place, containing a collection of pages and tools. The Domino Equivalent an NSF Database. The room 174 is the main container for a QuickPlace's content. For example, when using the Millennia Place, most of what is seen is contained in the Room object. The Room object is always called Main.nsf, and holds folders 176 and pages 182 for the QuickPlace, as well as managing links to any subrooms 194 in the place object 172. Room object 174 uses elements held in other databases. For example many of the standard images QuickPlace displays are in a resources object (not shown). Each room 174 has its own security and authentication, and the information required to do this is contained in databases such as Contacts1.nsf. A room 174 breaks down a place 172 into smaller areas to help define structure. Each room 174 has its own security and authentication. This allows separate user groups. It also means that subrooms 194 can be created for separate projects, forming a separate shared space. The room object 174 then forms a common entry point where shared resources can be stored.

The room object in PlaceBots: to locate a room 174, one looks in the main QuickPlace Server 170 directory, then looks into the room object (a directory bearing the name of the QuickPlace), then looks for a database called "Main.nsf".

Returning to previous LotusScript example of locating a Place 172 (Table 2), the match string can be extended from "quickplace\millennia" to "quickplace\millennia\main.nsf"

to find the room object 174, as set forth in Table 3.

TABLE 3

SCRIPT PROCEDURE TO FIND A ROOM OBJECT

Set dirPlace = New NotesDbDirectory( g_sServerName )
Set ndbPlace = dirPlace.GetFirstDatabase( DATABASE )
sNdbPlaceFilepath = ndbPlace.FilePath
If Instr(1, Lcase( sNdbPlaceFilepath ),
|quickplace\millennia\main.nsf| ) Then
'//the Room id found.

To access elements contained in a room 174, the views and folders 176 in the room are accessed. For example to find the elements visible in the Table Of Contents (TOC), the "h_TOC" view is used.

The Room object 174 in HTML is visible in URLs as the "main.nsf". To access room object 174 most easily, a relative path is used from the current object if it is in the same Place 172. For example, when creating a URL link from a subroom 194 to a room 174, the URL begins as follows:

<a href="../../Main.nsf/ where the "dot dot slash dot dot slash" syntax is a part of the URL, not an abbreviation for this example. Using this relative URL makes the URL more robust. In other words, this URL can be used to find the (Main.nsf) room 174 for any place 172.

Room fields 180 used to define rooms 174 are set forth in Table 4.

TABLE 4

FIELDS DEFINING ROOMS

| Field Name | Description |
|---|---|
| h_HaikuName | The name of this Place |
| h_AreaType | The name of the template used to create this room. |
| h_AreaParent | The name of the parent database |
| h_ShowSecurity | If h_SetSecurity = 1, the QuickPlace server sets h_ShowSecurity to 1. |
| h_SetCalendar | Determines if the Calendar will be visible in a Room. If the field has the value of "1" a link to the Calendar will be displayed in the sidebar |

TABLE 4-continued

FIELDS DEFINING ROOMS

| Field Name | Description |
|---|---|
| h_SetSecurity | This field works in conjunction with the h_ShowSecurity field. It is only valid for Readers and Authors, because Managers must always be able to edit security of a Room. If the field is set to "1" a link to the Security page will be displayed in the sidebar for Readers and Authors (if they select Security in this case they will see only their own information) |
| h_MailDb | The name of the database that receives email addressed to this Place. |

Folder Object

A folder object 176 is an object for indexing content, grouping related pages 182, and dividing a room 174 into sections without imposing new security. The Domino equivalent is Notes folder or view 206, and Notes folders 206 have three functions. For the user, they provide a logical grouping of related documents. This makes it easier for the user to find documents, and allows people with a shared interest to work an area of a QuickPlace. The other way of using folders is in the user interface, or "User" folders. Within user folders there are seven different types:

1. Standard List
2. Headline
3. Slide Show
4. Response List
5. Ordered List
6. Table Of Contents
7. Index Some of the folders in look ups by developers are set forth in Table 5.

TABLE 5

VIEWS USED TO REFERENCE OBJECTS

| View Name | Description |
|---|---|
| h_Index | Provides a list of all published Pages in a Room, listed by h_UNID, the unique identifier for a Page. Lists all published items in a Room, this not only includes Pages but all of the Objects in a Place. For example, Pages, PlaceBots, Fields, Skins and Forms. |
| h_QDK | Every Design Note in a Place. The h_QDK view contains a form formula to open different documents using different forms. For example: If the field "h_Type" is "0" then use the form named "h_Page". The result of this form formula is that the QDK view allows developers to inspect the properties of some Design Notes. The supported types are: "h_Page", "h_Folder", "h_Room", "h_SubRoom", "h_Error" and "h_RoomType". |
| h_TOC | List of all items displayed in the Table Of Contents. Items must have the "h_IsInTOC" field with a value of "1" and be published with no replication-save conflict. |
| (All) | Every item in the Room. Sorted by the h_Name field: the readable name of the |

TABLE 5-continued

VIEWS USED TO REFERENCE OBJECTS

| View Name | Description |
|---|---|
| | item. For example "Welcome", representing the default Welcome page. |

Folder Fields

The following Fields are used to define data notes that render as Folders. Folders exist in a visible form within a QuickPlace. In other words they can be viewed by opening the NSF file in the Notes Client or Domino Designer. In conjunction with this view, a data note exists, providing information about that Domino View or Folder. Table 6 lists the fields are contained in the data note and provide information about the Domino View or Folder.

TABLE 6

FIELDS USED TO DEFINE FOLDERS

| Field Name | Description |
|---|---|
| h_FolderStyle | When creating a new folder, one is given the choice to create a new folder based on a number of templates. This field denotes which type of folder has been created.<br>"1" = Standard List<br>"3" = Headline<br>"4" = Slide Show<br>"5" = Response List<br>"7" = Ordered List |
| h_FolderStorage | The "internal" name of the folder, in other words, the name by which it is known to the system. The value of this field is used in documents to tell QuickPlace in which folder it should be used. |
| h_CanAddPages | When creating a new folder, the manger is presented with the options, to the question "Who can add pages to this folder?". If only managers is chosen the value of "0" is written to this field. The default is " " which means all authors can add pages to this folder. |

Form Object

A form object 178 is a document used to create new QuickPlace content. The Domino equivalent is a data note of type "h_Form". Form object 178 is a resource used to create, manage and display content, therefore defining the schema of the application. Forms contain fields to hold data, therefore creating and displaying content. Forms can also contain scripts within them to provide logic within the Page. For example, a form can contain form validation to make sure that a field contains only numbers. Forms can also initiate processes outside the page. This is done by creating a PlaceBot 184 and associating the PlaceBot with a Form 178. PlaceBots 184 are not contained by the Form but there is a association between them.

Forms are created with the Domino Form "h_PageUI" with the field h_Type set to "h_Form". New forms 178 with custom structure and logic can be created by room managers.

Form Fields

Table 7 sets forth the fields 180 used to define the structure of a form 178.

TABLE 7

FIELDS USED TO DEFINE FORMS

| Field Name | Description |
| --- | --- |
| h_FormDescription | The content of this field appears as the description of the form appearing in the "New" page. |
| h_WorkflowType | Allows 1–4 approvers and some other options. This is normally set to "h_Standard". |
| h_ApprovalCycle | |
| h_EditorInChief | Allows 1 approver and fewer options. |
| h_MultipleEditors | By setting this field, all members of QP to edit pages created with this form. |
| h_Standard | None of the above. |
| h_SetPagecomponent | sView Should = h_FieldDefinitions |

Field Object

Field object 180 is used to construct (HTML formatted) input fields in forms 178. The Domino equivalent is a Data note of type "h_Field". Fields are constructed from the Domino Form "h_PageUI" with a the field h_Type set to "h_Field".

QuickPlace field object 180 defines the structure of the container, not the content. The values contained in a page 182 are contained by the page, not the fields 180. The h_FieldType attribute to a field 180 determines what sort of field it is. This determines what the field will do when it is rendered in a browser. For example, a field 180 of type h_DateControl will provide the user with a date picker widget.

Domino fields are used to define the attributes of Quick-Place fields 180 are set forth in Table 8. QuickPlace fields 180 are drawn to the screen as HTML, they are not created by a Domino Field in a Domino Form.

TABLE 8

FIELDS USED TO DEFINE FIELDS

| Field Name | Description |
| --- | --- |
| h_IsUser | Defined h_True means this is a custom form |
| h_PublishInFolder | UNID of the folder + "\|" + name of the folder |
| h_FolderStorage | |
| h_Name | "Import" and is related to the h_SystemName field which often has a similar value such as "h_Import". |
| h_FieldLabel | Instructional information that might be useful for someone editing this field. Similar to the Static h_FieldType. Containing information to help the user, but only displayed in edit mode." For example: <script> (h_CurrentSkinType =='h_Edit' )?" ": C(self, 'Note: Clicking on the title of this page in its folder or in the sidebar will open the page that it points to. To edit the page again later, click its title in the Index.') ;</script>" |
| h_ContainerUNID | The UNID of the Form which contains this field. QuickPlace uses a Design Note to create forms, each of these having an internal name. The h_ContainerUNID contains the internal name of one of these QuickPlace Forms. |
| h_FieldType | There are many different types of Fields. The following types are listed as examples to help understand how Fields work in general. |
| "h_Attachments"= | Enables the attaching of files. |
| "h_CalendarControl"= | Includes date and time controls and a duration field |
| "h_DateControl"= | Date field with date picker widget |
| "h_DateTime"= | Contains Date and Tine information. |
| "h_DocAuthor" | Contains a Domino Heirachical name of the original Author of the Document. |
| "h_DocCreated"= | Creation date of the page. |
| "h_DocModified"= | Modified date of the page. |
| "h_DocSize"= | Size of the page. |
| "h_NamePopup"= | Select listing members of the QuickPlace |
| "h_RichText"= | Rich text field. Allowing editing via the rich text editor applet. |
| "h_Serial"= | A unique number to identify the document. |
| "h_Static"= | Static text, used to provide information about the accompanying field. May also include link to an image. |
| "h_Subject"= | The Documents subject. |
| "h_TaskControl"= | Used in the Task form to insert the task control tool. |
| "h_TextInput"= | Simple text equating to the "<input>" field in HTML. |
| "h_TextPopup"= | Text select list, equating to the "<select><option>"in HTML. |
| "h_TimeControl"= | Select lists for hours, minutes, AM/PM. |
| "h_CalendarControl"= | Field containing control tool used in the calendar field. |
| "h_CreateMSExcel"= | Field enabling the upload of Excel documents. |
| "h_CreateMSPowerPoint"= | Field enabling the upload of PowerPoint documents. |
| "h_CreateMSWord"= | Field enabling the upload of Word documents. |
| "h_Import"= | Field enabling the upload of imported documents such as HTML. |
| "h_MultipleImport"= | Field enabling the upload of multiple documents, such as a series of HTML documents. |
| "h_NotifyIndicator"= | Field indicating if members should be notified of the creation of content or their inclusion in the Contacts1.nsf. |

Page Object

Page object 182 is a basic building block for content. The Domino equivalent is a data note, form and subform. Pages form the basic units of content, relying on the structure of QuickPlace to create, manage and render them in a Web browser. It differentiates structure and content cleanly. Notes structural elements such as Forms Views and so on provide structure, whereas Notes Documents provide pure data content. In the Domino environment the division between structure and content becomes blurred. This is because when the data in a document is being represented in a Web browser, it is possible to use the data to format itself using HTML. The data is able to start defining structure by creating HTML links, tables, references to images and so on. In the QuickPlace OM, the same is true. Pages can be created in a number of ways. Table 9 sets forth the fields used for defining page objects.

TABLE 9

FIELDS DEFINING PAGE OBJECTS

| | |
|---|---|
| h_NotInSearch | Having the value of "1" will exclude the field from being included in a full text search. This allows functional content in fields such as JavaScript or static text to evade returning a hit during searching. |
| h_Position | Indicates the fields position of appearance in a form. Typically numbers such as 100 are used. |
| h_FieldFormat | "h_FieldFormat" indicates formatting options, "h_All" "h_BannerOptional" "h_BannerRequired" |
| h_BannerRequired | Always display subject as a banner at top of page |
| h_BannerOptional | Allow user to choose banner or not |
| h_NoBanner | Do not display the subject on the page |
| h_FieldIsRequired | 1 = The field is required and the user will be prompted if they do not fill it out. |

Page Fields

Page Object in LotusScript and JavaScript: developers wanting to customize pages 182 will generally want to manipulate the page's field 180 values. Fields existing in a Page are generally rendered to the HTML document in the background as JavaScript variables. They are then visibly rendered via document.write( ) functions. If a field exists, it can be accessed in the browser via a variable with the same name as the field.

The PageBody Field holds the main content or "body" of the page.

Table 10 sets forth the fields 180 used to define page 182 documents in QuickPlaces.

TABLE 10

FIELDS USED TO DEFINE QUICKPLACE PAGES

| Field Name | Description |
|---|---|
| h_Form | The QuickPlace form used to create this page. This is not the Domino "Form" field which denotes which form Domino links the file to. The Domino "Form" field will contain "h_PageUI" for virtually all objects in a QuickPlace. |
| h_PageType | This field is set to null when the document is a visible document. Only when the object is in design mode do the other values appear: "h_Response" the document is a response to a topic document. This value is only valid in response folders. "h_Revision" this means that the document is being revised, and is not available for public access. "h_Mail" means that the document is a mail document, being either sent or received by QuickPlace. |
| h_Originator | The creator of this page. This field contains a full hierarchical name, for example: "CN=David Wyss/OU= QuickPlaceName/OU= QP/O= ServerName". All users have the second OU part of the name set to QP. This is done so that when QuickPlace is used on an Overlay server (QuickPlace and Domino together) QuickPlace can avoid conflicts between Domino registered users and QuickPlace users. |

TABLE 10-continued

FIELDS USED TO DEFINE QUICKPLACE PAGES

| Field Name | Description |
|---|---|
| h_NameIsBanner | Denotes if the page's name should be displayed as a banner. If it is to be displayed as a banner, this field contains the value "1". Setting this field is done when the user clicks on the "Show the title, author and date on page?" checkbox. |

The JavaScript "document.write" method is used when using the PageBody to write out HTML content in a QuickPlace page. This field can be printed onto the screen via a document.write(PageBody) method called in a QuickPlace document. The following is an example of using this technique.

In a Placebot, write the contents of the document into the PageBody field. If the PlaceBot has not run, or not run correctly, the PageBody field will be empty. If the document is displayed in a form where the PageBody JavaScript variable is not declared, an error will be reported. To avoid an error through an undefined variable, use the "typeof" operator. This test assigns a message string to the sPageBodyMessage variable and prints that instead of the PageBody. To customize this message, the text in quotes on the PageBodyMessage line is changed. Then the following is included in the HTML document:

```
<script language=JavaScript>
if ( typeof( PageBody ) == "undefined" ) {
var sPageBodyMessage =    'Run the Mapperizer PlaceBot
                           to see a site map here. . . ';
document.write ( sPageBodyMessage )
} else {
document.write( PageBody )
}
</script>
```

Page Object in HTML: some of the most commonly referenced JavaScript variables in Pages are set forth in Table 11.

TABLE 11

COMMONLY USED JAVASCRIPT VARIABLES IN PAGES

| Field Name | Data Type, Description |
|---|---|
| h_Name | String, readable name of the Page |
| PageBody | String, content of the page. |
| h_SystemName | String, the internal name of a page. For example, 'h_Welcome' |
| h_Originator | String, full Notes format name of the document creator For example: 'CN=Anna Rath/OU=Millennia/OU=QP/O=Server'; |
| h_IsPublished | String, number representing "1" for published or "0" for not published. |
| h_LastTimePutAway | String, representing the date and time the Page was last saved '09/03/2000 07:54:08 PM' |
| Form | String, Domino Form name used to create the Page. Most documents in a QuickPlace are created with the 'h_PageUI' Form. The value that differentiates fields is the h_Type field. |

TABLE 11-continued

COMMONLY USED JAVASCRIPT VARIABLES IN PAGES

| Field Name | Data Type, Description |
|---|---|
| HTTP_COOKIE | String, all cookies available to that Page. |
| HTTP_HOST | String, name of the server. For example 'millennia.com' |
| HTTP_REFERER | Page used to send the user to this page. |
| HTTP_USER_AGENT | String, browser used to access the current Page. For example: 'Mozilla/4.0 (compatible; MSIE 5.0; Windows NT; DigExt)' |
| REMOTE_USER | String, full name of the person reading the Page, for example: 'CN=Doug Mudge/OU=Millennia/OU=QP/O=Server'; |
| Server_Name | String, the server name, for example: 'dwyss.lotus.com' |
| h_DocSize | Integer, size of the page, for example: 4705 |
| h_ModifiedDate | String, date and time the page was last saved, for example: '09/03/2000 07:54:05 PM'; |

Member Object

A member object 190 is a data note listing a user in the Contacts1.nsf. The Domino equivalent is a note in Contacts1.nsf. Members 190 are records specifying user-access to a room 174. A member note contains information about a team member of a QuickPlace. In addition to this data, the member must be listed in the access control list (ACL) of main.nsf and in a group in names.nsf to pass authentication.

Table 12 sets forth the fields 180 used to define members 190.

TABLE 12

FIELDS USED TO DEFINE MEMBERS

| Field Name | Description |
|---|---|
| h_Password | This member's password. Encrypted with @Password |
| h_FirstName | This member's first name |
| h_LastName | This member's last name |
| h_PhoneNumber | This member's phone number |
| h_EmailAddress | This member's email address |

Table 13 sets forth the fields 180 used to define Groups.

TABLE 13

FIELDS USED TO DEFINE GROUPS

| Field Name | Description |
|---|---|
| h_Members | The list of members who belong to this group, listed in full heirachical format. |

Building URLs: Referencing Images

Figure 6:
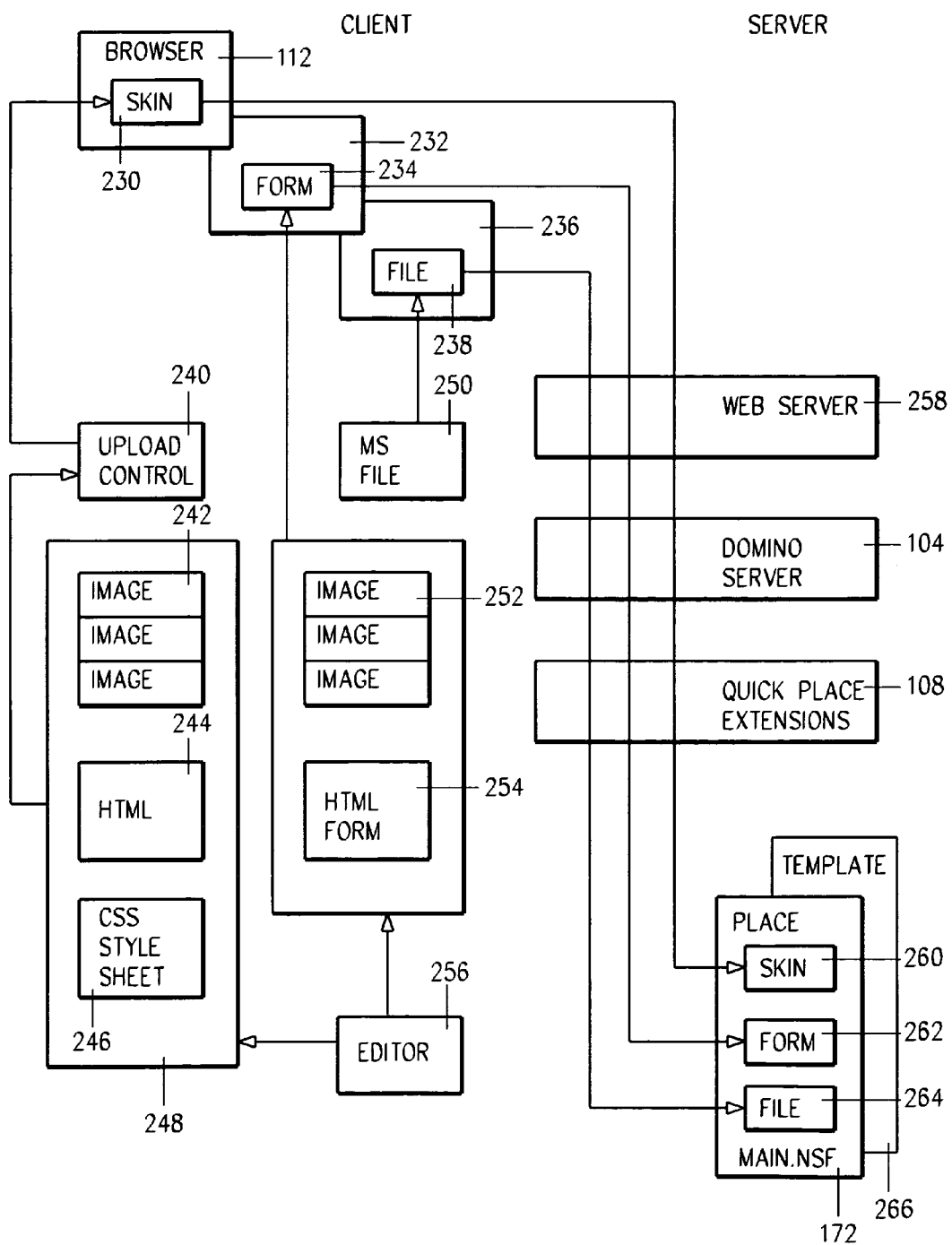
FIG. 6 is a flow chart representation of generation of collaboration space data objects.

The following section deals with the issue of using images in QuickPlace. Referring to FIG. 6, due to the fact that QuickPlace is a platform for creating Websites, images 242, 252 form a vital part of the QuickPlace object model. QuickPlace's structure provides many ways to include images in pages. For example when creating skin files 260, the images 242 are automatically uploaded into the Quick-Place 172 when the skin file 230 is uploaded.

Described hereafter are techniques involved for fully automated importing procedures within QuickPlace. An example of an automated importing would be when creating and uploading a Microsoft Word file 250. When this is done the images are imported without any interventions.

There are also instances where some developer intervention is required, such as when creating a Skin file 230, or writing an importable HTML file 254, or referencing files required to display the results of a PlaceBot and so on.

Creating skin files are fully described hereafter in connection with themes.

Three methods are used for importing images. These are:

Method 1: Provide a URL to an image and let QuickPlace upload the image. This method is used when creating skins and imported HTML documents that do not use JavaScript to reference images.

Method 2: Create a URL, have QuickPlace upload it, then reference it using HTML or JavaScript. This method is used when rendering image using JavaScript.

Method 3: Manually upload images into a document and reference them via URLs from a separate document. This method is used if the image is very large and it desired to have the user's browsers be able to cache the image; or if the image is referenced within a JavaScript function (QuickPlace does not import images when they appear within JavaScripts); or the image is referenced within a PlaceBot which creates new pages.

Overview: Imported HTML Forms

In accordance with a further embodiment of the invention, a review form may be designed in HTML separate from QuickPlace. The resulting form is then dragged and dropped into QuickPlace, which creates a form for it. This is done by creating a field for each html tag. Thus, each HTML field is parsed to create a corresponding QuickPlace field.

For HTML files, the HTML file is parsed, the linked images found, and the URLs processed. The original file, linked files, and the resulting HTML are then saved on the page with the HTML displayed in read mode, and the original file in edit mode.

Overview: MicroSoft Office Based Forms

In accordance with a further embodiment of the invention, an existing Excel spreadsheet or Word document in a power point presentation, for example, is used as a template, dragged and dropped by the browser user into a QuickPlace, which then creates from it a QuickPlace form. Thereafter, users can create new MicroSoft documents using the QuickPlace form.

For Office documents, the MicroSoft office native mechanism is used to convert the page to HTML. The original file and the resulting HTML are then saved on the converted page, with the HTML displayed in read mode, and the original file in edit mode.

Overview: Forms and Task Fields

In accordance with a further embodiment of the invention, a web browser way of creating and designing forms is provided. A browser user may, using QuickPlace and interacting with the QuickPlace user interface, create a form as an object of the QuickPlace and select and create fields for that form.

Overview: In Place Editing

In accordance with a further embodiment of the invention, a browser user can create MicroSoft Office documents from within QuickPlace, such as a new Excel web sheet. QuickPlace will automatically launch Excel, and when Excel is closed, QuickPlace will bring in the Excel spread sheet.

Using HTML

Because the Page, ListFolder, and Slideshow layouts share so many common components, one HTML file that applies styles to these three layouts can be created. HTML for the Slideshow Folder is created, which contains the superset of components used in the three layouts. To control how the non-applicable components display for a layout—for example, the Jump component for the Page layout, and the AuthorAndModified and Revision components for the ListFolder—various results are achieved by setting the emptyFormat, prefixHTML, and postfixHTML parameters.

For example, to have the empty components occupy the same vertical space as they do when in use, set the parameter as follows:
emptyFormat=" "
By placing each component in a separate table row, the component's row "collapse" when it is empty, so that it occupies no space. Given that the prefixHTML and postfixHTML parameters are not output when the component is empty, these parameters can be used to provide the following table structure:
emptyFormat=""
prefixHTML="<tr><td>"
postfixHTML="</td></tr>"

PlaceBot Description

Figure 9A:
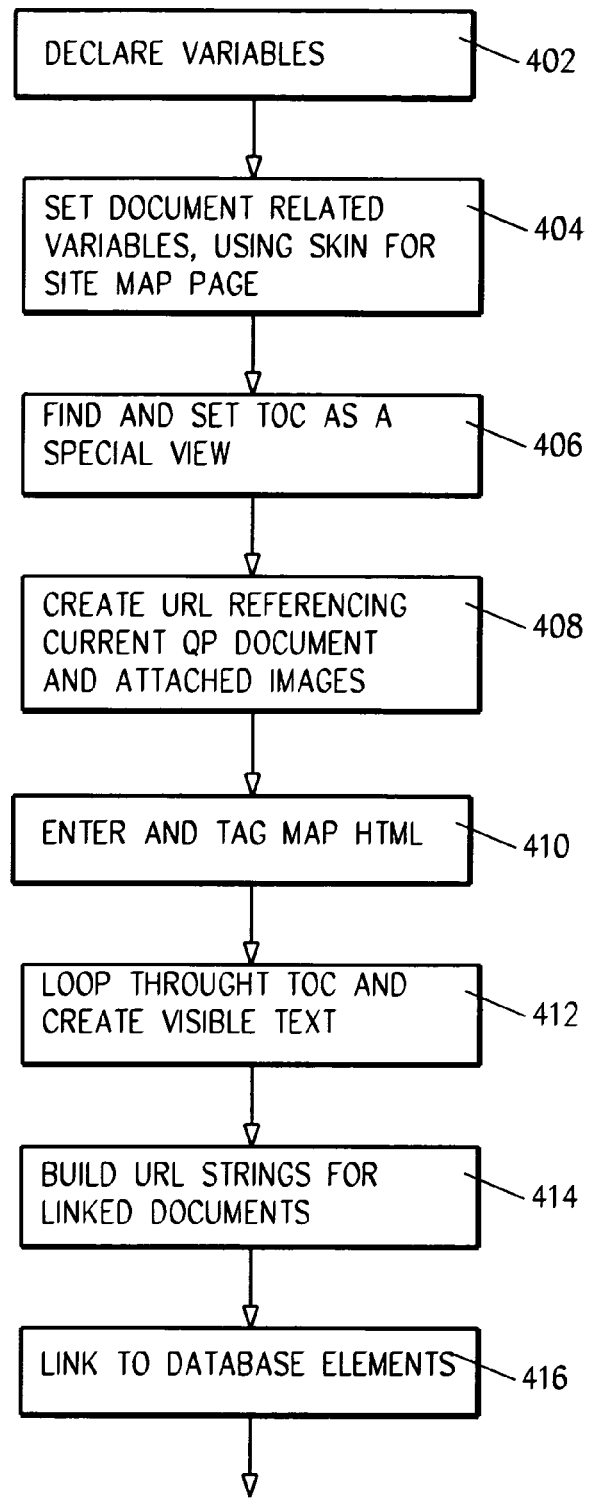
FIGS. 9A and 9B are a flow chart representing the method steps for creating a PlaceBot.
Figure 9B:
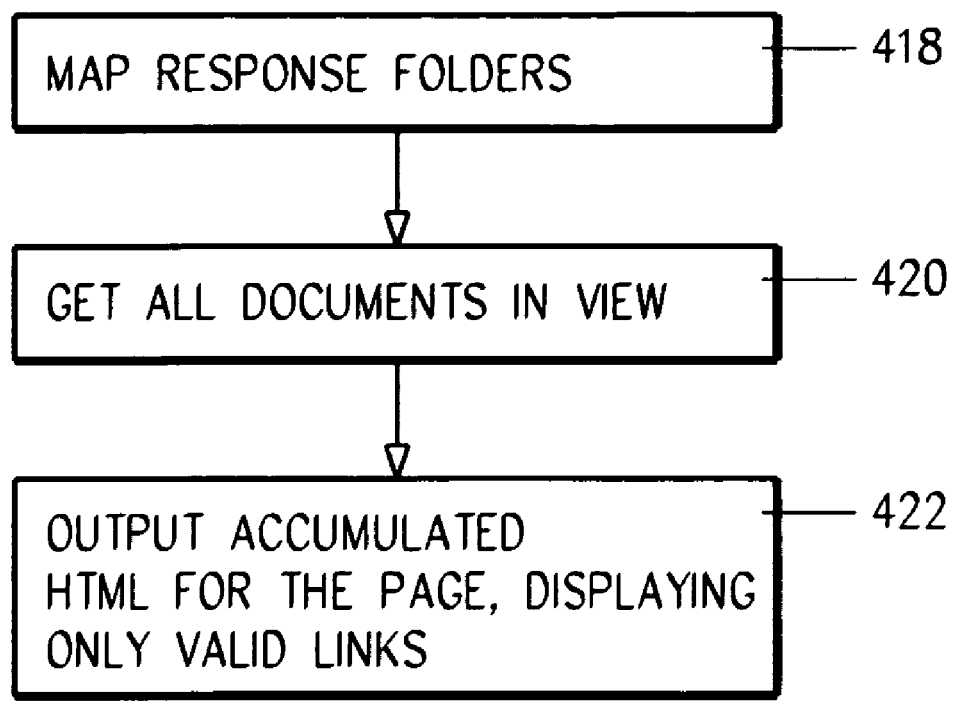

Referring to FIGS. 9A and 9B an exemplary method for creating a PlaceBot will be described.

In step 402, variables relating to the session, the database and its major structures such as view and key documents are declared.

PlaceBot starts off by Dimming (declaring) the variables related to the session, the database and its major structures such as Views and key documents. The Dims are typically divided into two groups; dims for Notes related In step 406, the table of contents (TOC) is found and set as a special view.

In step 408, URLs referencing current QP documents and attached images are created.

In step 410, map HTML is entered and tagged.

In step 412, a loop through the TOC is executed, and visible text created.

In step 414, URL strings are built for linked documents.

In step 416, database elements are linked.

In step 418, response folders are mapped.

In step 420, all documents in the view are gathered.

In step 422, valid links are displayed for HTML accumulated for the page.

Referring to Table 49, to make the map more presentable, the images are rendered on the screen in a table. Using a table allows creation of a little vertical space, and also alignomg the images to the right. This is done to make the pixel images a little less obvious to the reader. Due to the fact that the table is only one pixel high, it can be filled with a color to create a really pretty line.

Desktop Integration

Although Lotus QuickPlace is a web application that is displayed in a browser, much of the value that QuickPlace offers the user is its ability to easily allow content creation and content editing using tools and applications already familiar to the user. For example, in QuickPlace Release 1, users could write documents using Microsoft Word, the most popular and widely used word processor for the Windows platform, and then import these documents into QuickPlace. Therefore, Microsoft Word became a content-creation tool for QuickPlace.

In-Place Editing

Figure 13:
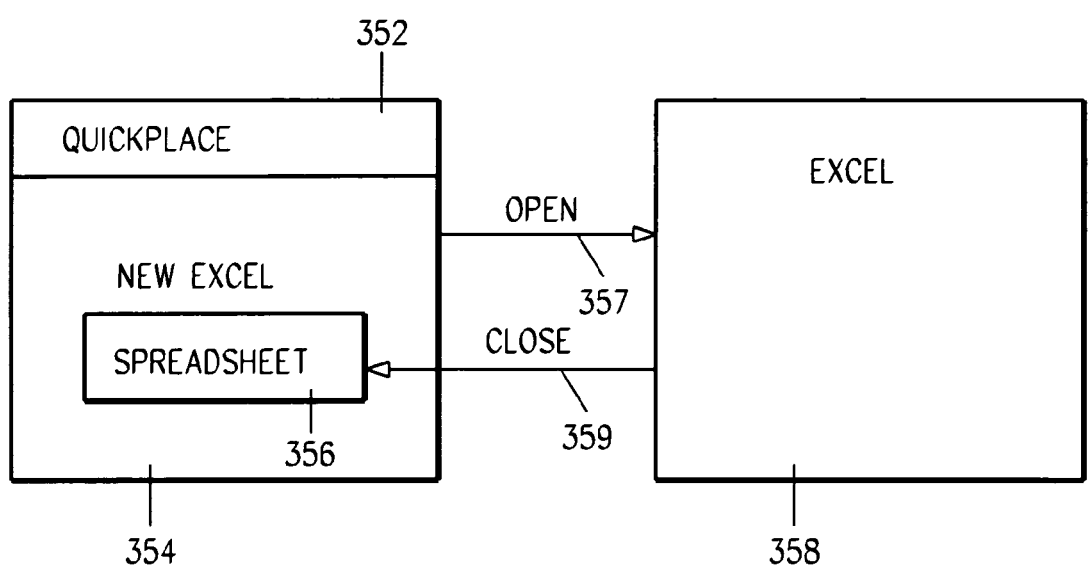
FIG. 13 is a flow chart illustrating in-place editing in accordance with the preferred embodiment of the invention.

Referring to FIG. 13, in accordance with a further embodiment of the invention, a browser user can create MicroSoft Office documents from within QuickPlace 352, such as a new Excel web sheet 354. As is represented by open line 357, QuickPlace will automatically launch Excel 358, and when Excel 358 is closed, as is represented close line 359, QuickPlace 352 will bring in the Excel spread sheet 356.

Referring to FIG. 6, in general, standard web files 242, 244, 248, 252, 254 and 250 are brought into the browser as files 230, 234 and 238 such as via upload control 240, sent to the web server 258, Domino server 104 and QuickPlace extensions 108 and converted into application enabled objects 260, 262, 264 in QuickPlace 172.

In accordance with a preferred embodiment of the invention, QuickPlace extends this concept further using better integration with the Windows desktop. In particular, the "Desktop Integration" feature area includes:

1. Round-trip editing of Microsoft Office and Lotus SmartSuite documents.
2. Support for importing additional file formats using the HTML export engine from Verity.

Round-Trip Editing of Microsoft Office and Lotus SmartSuite Documents

Users are able to create documents based on Microsoft Office and Lotus SmartSuite documents, and publish them into their QuickPlace. This is done by creating a document using Office or SmartSuite independent of QuickPlace and then dragging and dropping this file into QuickPlace—this process is referred to as "importing" Office and SmartSuite documents. Alternatively, the user will be able to create a page in QuickPlace and specify immediately that the page's content will consist of an Office or SmartSuite document. The user will then use the selected application to edit the page. This process is referred to as creating a "Microsoft Word page," for example.

In either case, users are able to edit QuickPlace pages using the same Office or SmartSuite application that created them. This, in effect, turns Office and SmartSuite into content creation tools for QuickPlace. At the same time, QuickPlace becomes a web publishing tool for Microsoft Office and Lotus SmartSuite users. Users will not have to learn a new content creation and editing user interface; they will simply use the tools that they have already become familiar with and which they have already used to create large amounts of content in the past.

Support for Importing Additional File Formats Using the HTML Export Engine from Verity Since users may want to import content or information that wasn't created with either Office or SmartSuite, in accordance with a preferred embodiment of the invention, various other file formats are supported making it much more likely that every user will be able to quickly publish data in collaboration space.

Further in accordance with this aspect of the invention, the import feature provides that the import code will be run on the server side. Thus, Internet Explorer users' Office and SmartSuite files are converted to HTML on the client machine using OLE automation. All Netscape users' files—and non-Office/SmartSuite files for IE users —are then uploaded to the server in native format, and converted to HTML using the "HTML Export" engine from Verity. Since this conversion will be performed on the server, no client code must be downloaded for Netscape users.

Round-trip Editing of Microsoft Office and Lotus SmartSuite Documents

In accordance with a preferred embodiment of the invention, collaboration space users will use OLE automation to support creating and editing of pages using Microsoft Office and Lotus SmartSuite applications. As described below, both Netscape and IE users will have the ability to import local files into QuickPlace using the HTML Export engine from Verity running on the server.

For IE/Windows users, the benefits of using OLE Automation are as follows:
1. Each application will be able to provide the best possible representation of its application data in HTML. For example, the best way to render a Microsoft Word file in HTML is to ask the Word application to convert it.
2. By using OLE automation, QuickPlace will be able to effectively choreograph the application in question as an integrated editing tool. When the user creates or edits a QuickPlace document based on Excel, for example, Excel will appear automatically, allowing the user to edit the QuickPlace document using Excel.

The primary disadvantage of using OLE automation for creating and editing document is that the target application must be installed on the user's client machine. To be able to edit a QuickPlace document using Word, the user must obviously have it installed locally. On the other hand, importing files using server-side technology will work regardless of what software is installed on the user's machine.

In accordance with a preferred embodiment of the invention, round-trip editing provides the following features. Each of these will be further described hereafter with reference to the various scenarios specified.
1. Creation of QuickPlace pages based on an Office or SmartSuite document. (Scenario #1.)
2. Import existing Office and SmartSuite documents into QuickPlace. (Scenario #2.)
3. Edit existing QuickPlace pages that were originally created or imported from an Office or SmartSuite application. (Scenario #3.)
4. Be able to edit Office 2000 documents saved as a "Web Page" in their original form. (Scenario #4.)
5. Export HTML documents from QuickPlace back to the user's hard drive in their original form. (Scenario #5.)
6. A new type of QuickPlace form based on an existing Office or SmartSuite document. (Scenario #6.)
7. Allow non-empty file attachment fields to be used in forms. (Scenario #7.)

Scenario 1: Creating a New Page based on Microsoft Word 2000

Figure 7:
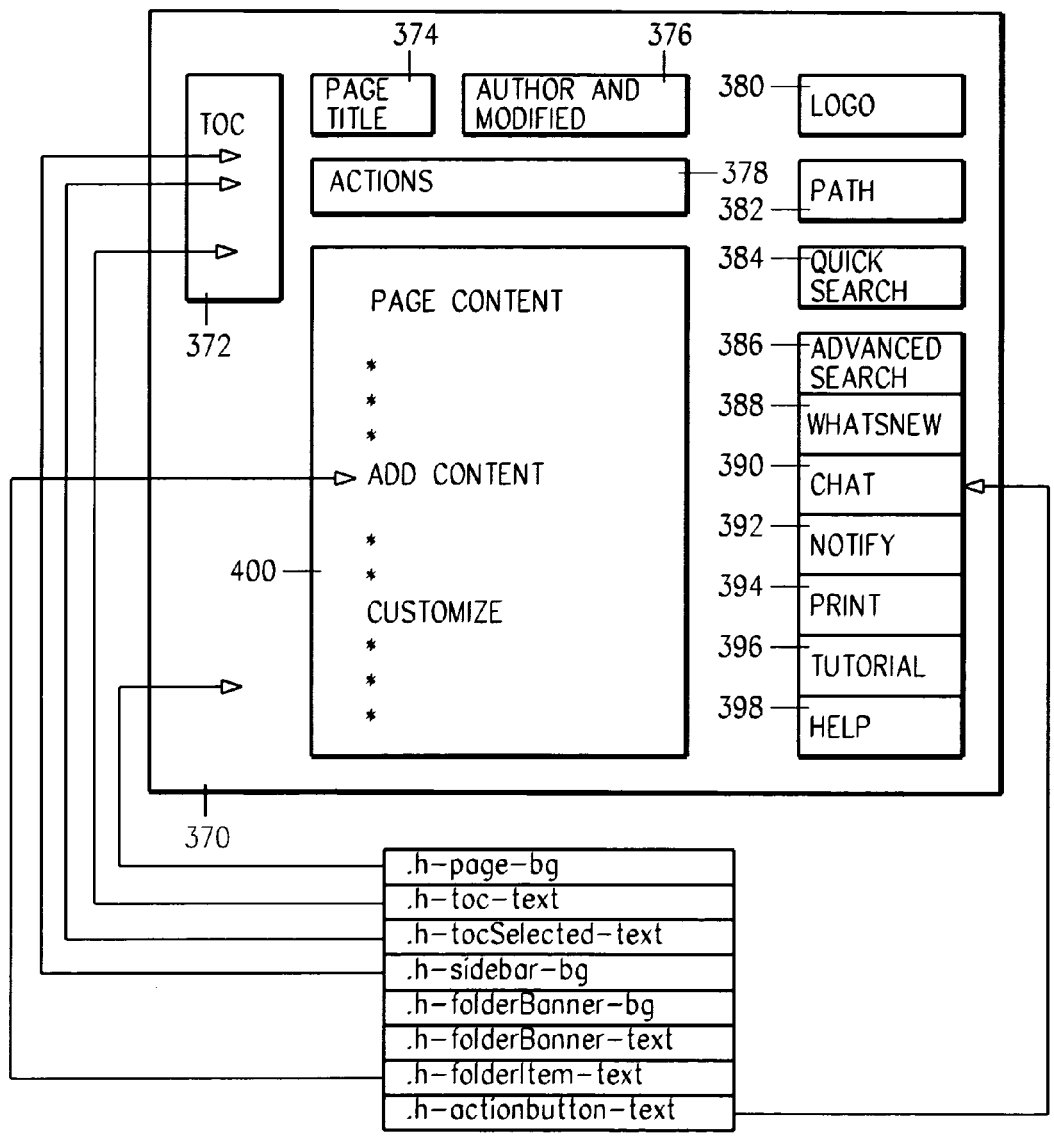
FIG. 7 illustrates a typical collaboration space user interface.
Figure 8:
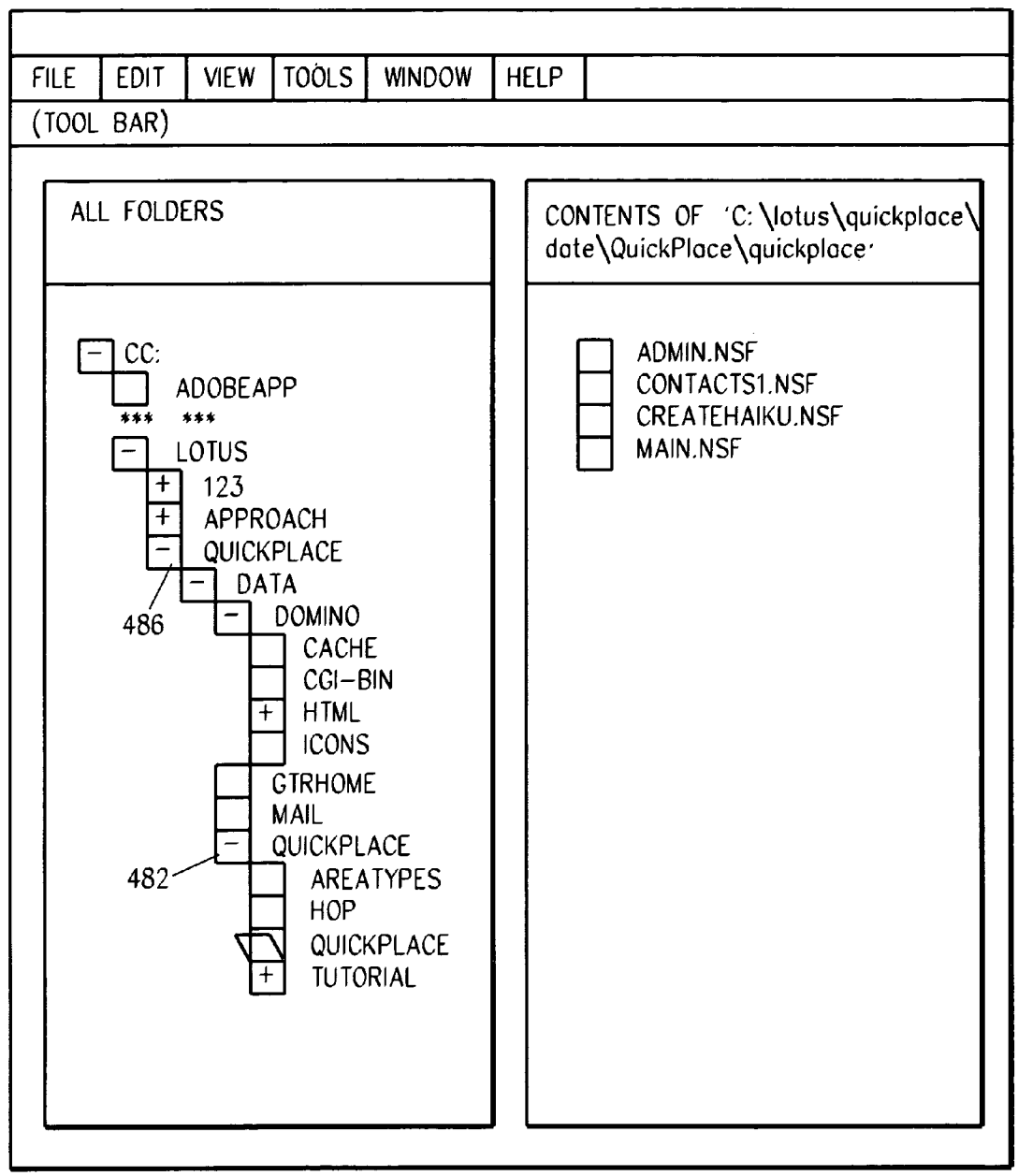
FIG. 8 is a schematic representation of a directory structure, along with the files in an exemplary collaboration space server.

1. Referring to FIG. 10 and Figure, a user clicks the "New . . . " button in the QuickPlace action bar 378 (FIG. 7). The "New . . . " scene 408 appears with a list 412 of available page types. In addition to the old choices (Page, Imported Page, Calendar Page, etc.) each Office or Smart-Suite application installed on the user's local machine will be listed with a radio button. The user will know right away which applications can be used for editing—and won't be mislead into trying to use Office and SmartSuite applications they don't have on their machine.

This list 412 is generated by a hidden ActiveX upload control 240, implemented by a DLL, which will be downloaded to client 102 only once. Once installed on the users machine, it will be able to determine quickly which Office and SmartSuite applications are installed on the machine by attempting to obtain a COM pointer to each application's OLE automation server object. This pointer will only be obtained successfully if the application is installed.

The control 240 has no UI. It will be created without a window (or with a zero-size window) and will simply return information to the JavaScript in the HTML scene.

Next, JavaScript in the scene will query the control for the list of applications, and generate the corresponding list 412 of radio button 414 choices. Performance should not be an issue; the result will appear to be HTML that is "aware" of properties of the local machine.

2. User selects "Microsoft Word 2000 Page" 416 and clicks "Next . . . " 418. A new scene 420 appears in QuickPlace containing the upload control—the control will display 422 a single Word.DOC file 424, with no name and will also appear grayed out. At the same time, Microsoft Word 2000 will be launched in the foreground, displaying a new, empty Word document 426.

Since the edit scene 420 contains the upload control 422, it is loaded immediately as the user enters the scene. The upload control will be provided with the application chosen by the user, and will immediately launch the application 426. It will also display a single file icon 424 representing the file being created.

Word 2000 will be displayed in a separate window 426, allowing the user to use Word in the same manner as always.

3. User types in a new Word 2000 document, and then closes the Word file 426, either using File→Exit, File→Close or File→Save As 428. QuickPlace detects that the original Word document is no longer being editing and brings the QuickPlace window 420 to the foreground. The Word file is converted into HTML and displayed in the upload control 422.

In accordance with the preferred embodiment of the invention, OLE automation is used to determine whether or not the user is still editing the new Word file 426. As the user is editing the document in Word, the QuickPlace upload control 240 will periodically query Word for the list of documents currently active. When the original document is no longer active, QuickPlace knows that the user has finished his/her edits and that it should import the file into QuickPlace 108. Any of these UI actions can finish the edit session on the original document:

File→Close: The user has closed the original file, but may continue to use Word to edit other .DOC files.

File→Save As: The user has chosen to save the original file with a new name on their local machine File→Exit: The user has quit Word entirely.

Regardless of how the user finishes editing the document, QuickPlace will detect that it is no longer active in Word. If the file's contents have changed (i.e. it is not empty) the file will be converted into HTML.

4. User publishes the page and the new .DOC file, along with its equivalent HTML file, is uploaded to the server.

After the .DOC file is converted to HTML, it is uploaded to the server. The HTML and DOC files are both attached to the same Notes document, and a Notes field is set indicating to the QuickPlace JavaScript UI which HTML was created.

Scenario 2: Import an Existing PowerPoint 97 File into QuickPlace

1. User clicks "New . . . " and then selects "Imported Page." The import scene with the upload control is displayed—this time the control is initially empty.
2. User selects an existing PowerPoint 97 (.PPT) file from the local hard drive and drags/drops it into the upload control. A progress dialog box appears displaying "Converting from Microsoft .PPT format to HTML. Please Wait . . . " Later, a PPT file icon is displayed in the upload control. OLE automation converts the file into HTML and imports it into QuickPlace.
3. User publishes the page. The .PPT and all of its associated files are uploaded to the server. The slides from the PowerPoint presentation are all displayed in the same QuickPlace page, along with "Previous," "Next" and "Zoom" buttons. Referring to the UI of FIG. 12, these slides are displayed in the same QuickPlace page.

Figure 12:
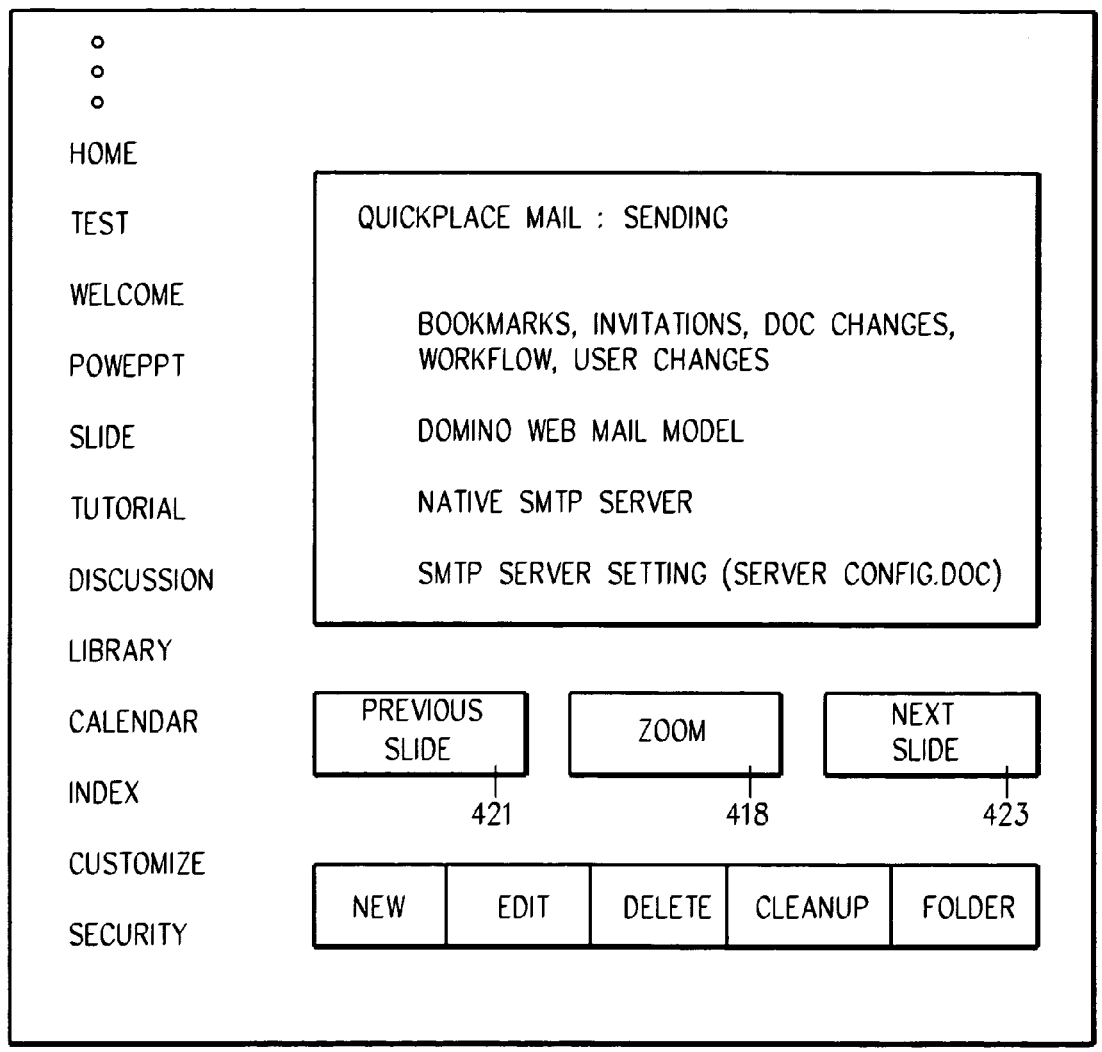
FIG. 12 is a schematic representation of a screen capture illustrating the user interface for in Place editing of Microsoft documents.

Referring to FIG. 12, clicking the "Zoom" button 418 causes a separate browser window to appear with a larger version of the current slide; it will also contain "Next" 423 and "Previous" 421 buttons. Displaying multiple PowerPoint slides, Excel worksheets, or other data in the same QuickPlace page is accomplished by uploading a series of HTML documents, one per slide/worksheet, to the same Notes document. In addition, each of the HTML documents is modified to link to the next and previous document. When the user clicks on "Next" at read time, a URL is issued to load the next slide in the page content frame as follows: "$FILE/slide5.htm?OpenElement"—referring to the next slide in the sequence. All images and other support files are attached to the same Notes document as well.

Scenario 3: Edit Existing Microsoft Excel 97 Page

1. User views Excel 97 page in QuickPlace and clicks "Edit . . . " The edit scene with the upload control is displayed and the Excel 97 .XLS file is displayed as a file icon in the control. In addition, Excel 97 is automatically launched with the user's original .XLS file.

In accordance with a preferred embodiment of the invention, the associated Office or SmartSuite application is automatically launched and given the original file. This allows the user to edit the QuickPlace page directly without having to double click on the file icon. It gives the user the impression that she is directly editing the QuickPlace content using Excel 97, for example.

If Excel is not installed on the machine when this page is edited, for example if a different user edited the page or the original user used a different machine, an error message appears informing the user that Microsoft Excel is required to edit the page. However, the edit scene is still displayed with the XLS file icon—allowing the user to replace it with a different Excel file if such a file were available.

2. User finishes editing the Excel XLS file, saves and exits Excel. The XLS file is converted into HTML. Finally, the user publishes the page and the new version of the XLS file, along with the HTML equivalent, is uploaded to the server.

Implementing this feature is no different from the page creation scene, described above. The same code is used to detect when the user has stopped editing the Excel 97 document, and to convert the XLS file into HTML.

Scenario 4: Import and Edit an HTML File Originally Created by Microsoft Word 2000

One of the principal features of Microsoft Office 2000 is the ability to save native Office documents, .DOC or .XLS files for example, as HTML without losing any of the original formatting, layout or other information specific to that Office application. For example, users can save a Word 2000 document as HTML, and then later open that HTML file using Word and see the document in its original form, without losing any fidelity along the way.

QuickPlace today allows users to import HTML files that were originally created by Office 2000, (Word, Excel or PowerPoint) into QuickPlace like any other HTML file. However, in accordance with a preferred embodiment of the present invention, users may edit pages created by importing such HTML files, using the Office application that originally created them. This scenario describes such an edit operation:

1. User creates a document using Word 2000, and then uses the Word 2000 "File→Save As Web Page" command to save the file.

Now the user has an HTML file on the local hard disk that contains the text in HTML format, along with formatting information saved with XML tags. In addition, Word has also created a number of support files, such as images, an "XML file list" file, style sheets, and other files. All of this information is used by Word to re-open the file later and obtain all of the original formatting and style information.

2. User imports this new HTML into QuickPlace, using the same import UI.

In accordance with this embodiment of the invention, all of the support files that were created by Word 2000, along with the HTML file, will be detected and uploaded to QuickPlace. Previously, only the HTML and any images referenced by it were uploaded. Now, the HTML file is parsed to determine whether it was created by an Office 2000 application. If it was, all of the support files are located on the user's hard disk and uploaded to the server.

3. Later, user edits this imported QuickPlace page.

As soon as the user clicks "Edit," QuickPlace displays the edit scene with the HTML file's icon, and also automatically launch Word 2000 to edit the document. Even though the file was converted to HTML by Word, it will be displayed in its original form.

Once the HTML file was identified as a "Word 2000 HTML document" (step 2 above) the Notes document corresponding to this QuickPlace page is marked as containing a Word 2000 document, as if it were created using the New . . . , Microsoft Word 2000 Page UI described in Scenario #1. After the user clicks "Edit," the HTML along with all of the supporting are downloaded to the user's machine. These files are placed in the user's TEMP directory, but the support files are placed into a subdirectory corresponding to their original locations when the file was created. This facilitates Word 2000 reopening the file.

After the user makes some changes and closes in the file in Word 2000, the new version of the file along with all of the support files are again uploaded to the server.

Scenario 5: Export an HTML Document Back to the User's Hard Disk in its Original Form.

Previously, the user could import an HTML file into QuickPlace and all of the associated images would be uploaded to the server as well. In accordance with a preferred embodiment of the invention, the user may now download the HTML and the images back to the hard disk—or to some other machine—in their original form.
1. User imports an HTML file into QuickPlace, which contains an image.

As before, the HTML and the referenced image, are uploaded to the server. In the background, the <img> tags in the HTML file are modified to refer to the copy of the image file attached to the Notes document on the server. In accordance with this embodiment of the invention, the original HTML file, i.e. an unmodified copy of the HTML file, is uploaded to the server as well.
2. User edits the imported page. The upload control is displayed with the HTML and the image file. The user then drags and drops the file onto the desktop.

In accordance with this embodiment of the invention, upload control 240 downloads the unmodified, original copy of the HTML to the user's machine, along with the image files that it refers to. Since all of these files are stored in the same directory on the user's machine, the <img> tags in the original HTML are modified again to reference the image file in the same directory. This is necessary since the image file may have originally been located in other directories on the user's machine.

In accordance with this embodiment of the invention, users may create a new type of QuickPlace form based on a Microsoft Office or Lotus SmartSuite document. For example:
1. User decides to create a new form: Customize→Forms→New Form
2. Referring to FIG. 14, the "New Form" scene 430 appears. If Microsoft Office or Lotus SmartSuite is installed on the user's machine, an additional paragraph 432 is displayed "Based on a Microsoft Office or Lotus SmartSuite Document". This allows the user to create a form based on a Word, Excel, or another Office or SmartSuite document. When pages are created based on this form, the corresponding application will be opened with a particular file. A hidden ActiveX control returns whether any Office applications are installed, or whether any SmartSuite applications are installed. If none are, the upload control 434 and its introduction text 432 are displayed.
3. User selects an Excel 2000 file 436 and drops it into the upload 434 control that appears below the "Based on a Microsoft Office or Lotus SmartSuite Document" paragraph 432.
This file, represented by icon 436, is uploaded to the server—this will form the basis for this form. Every user who creates a page based on this form will see Microsoft Excel opened and loaded with this file.
4. The user adds some additional fields 440–446 and then saves the form by clicking "done" 448.
5. Later, the user creates a page based on this new form: "New . . . ", select the form, etc. As soon as the user starts to edit the new page, Microsoft Excel is launched with the file that was originally attached to the form. This allows every user to enter information into a spreadsheet, for example. It's essentially the same as creating a page based on an Excel spreadsheet, except that Excel is pre-loaded with a file selected by whichever user created the form. If a particular user doesn't have Excel installed on her machine, she'll receive an error message informing her that Excel is required to create a page using the form.
6. After the user closes the Excel file, it is converted to HTML and uploaded to the server. The user may then enter values into other fields on the form and publish the page. Once the page is published, it is considered to be based on the Excel document—whenever it is edited in the future, Excel is again automatically launched with the given file.

Scenario 7: Create and Use a Form Containing a Non-empty File Attachment Field

Figure 15:
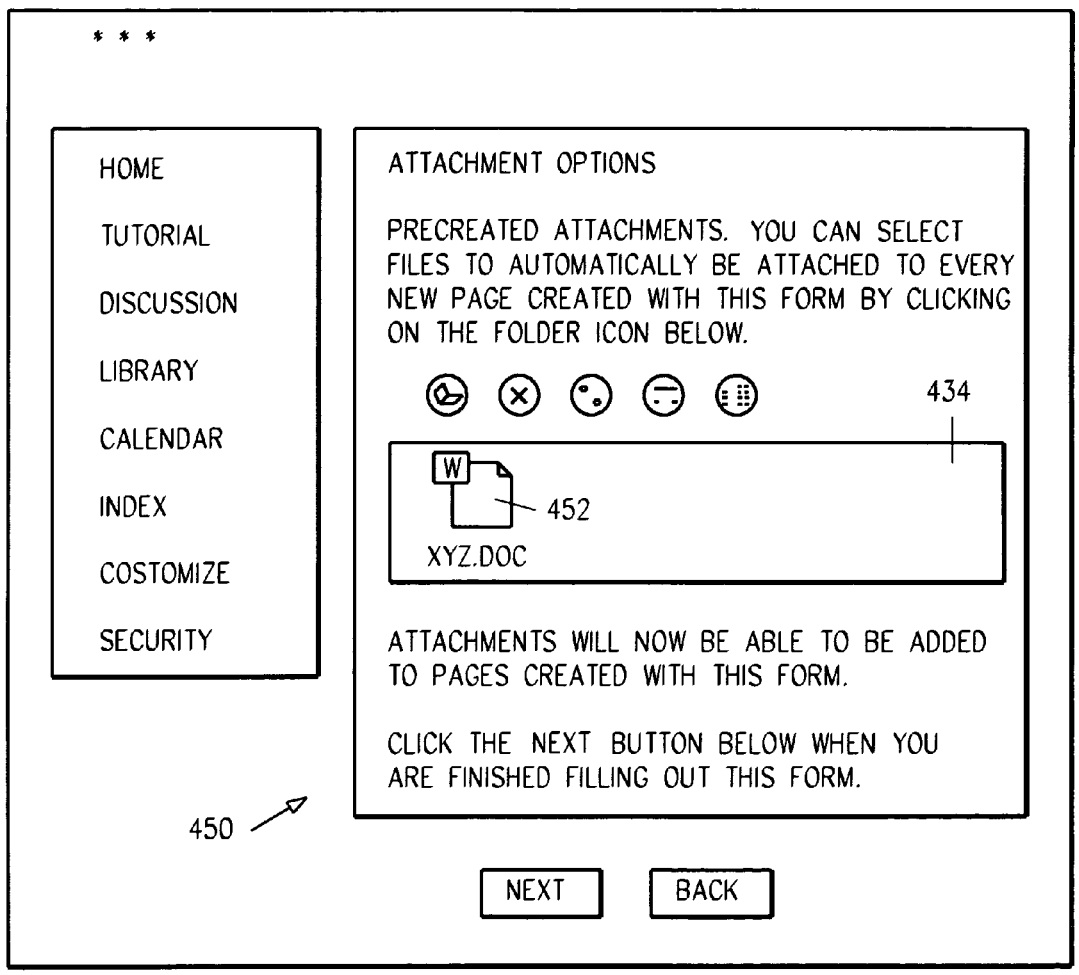
FIG. 15 is a schematic representation of a screen capture illustrating the user interface for attaching forms.

Previously, the "Attachments" field in QuickPlace could be added to QuickPlace forms to allow users to attach documents to pages created using a form. However, the attachment always appeared empty for each new page. In accordance with a preferred embodiment of the invention, the form creator may attach a file or set of files to this field which will appear pre-attached to each page created using the form. For example:
1. User creates a new form. Customize→Forms→New Form
2. User adds an "Attachments" field, by clicking the "Add" button, selecting "Attachments," and clicking "Next." The "Attachment Options" scene appears. Previously, the attachment options scene was empty. Referring to FIG. 15, in accordance with this embodiment of the invention, an upload control scene 450 is displayed. The user then may attach any set of files to the form, which will then be attached automatically to each page created based on that form.
3. User drops a Word document 452 into the upload control 434. Then the user saves the new field and the form—call it "Word Form." The Word document 452 will be uploaded and attached to the Notes document representing the QuickPlace form like any QuickPlace page.
4. Later, another user creates a page based on this new form: "New . . . " and "Word Form." An edit scene appears containing an upload control; the original Word document is displayed in the upload control.

Importing Additional File Formats Using an HTML Export Engine

Figure 16:
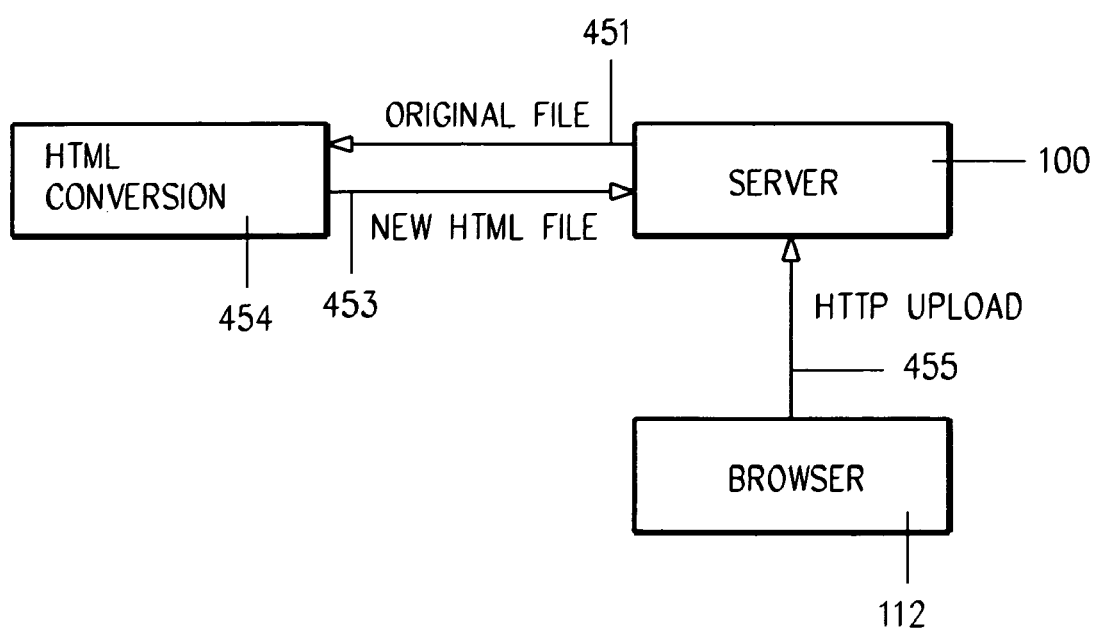
FIG. 16 is a system diagram illustrating importing interest content into collaboration space.
Figure 17:
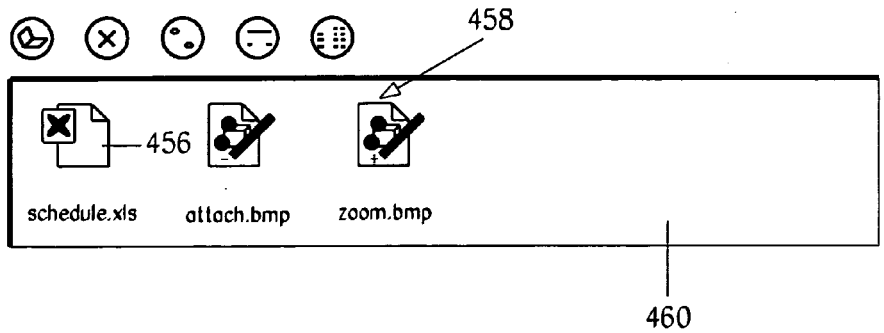
FIGS. 17–20 are schematic representations illustrating the user interface for editing a collaboration space file attachment and saving the changes back to collaboration space.
Figure 18:
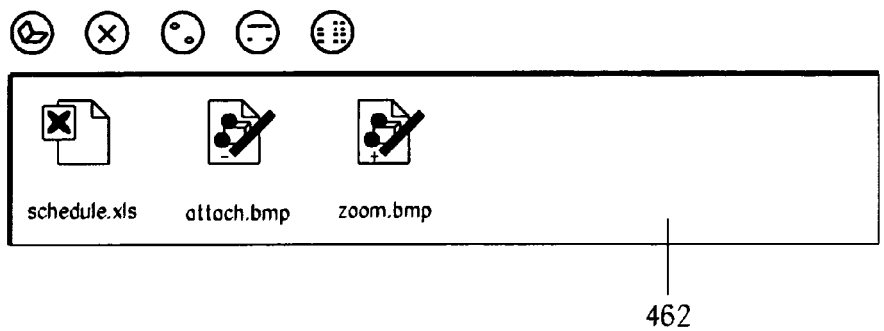
Figure 19:
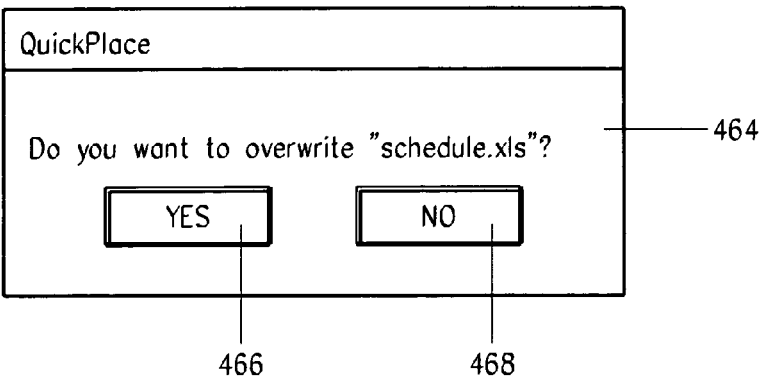
Figure 20:
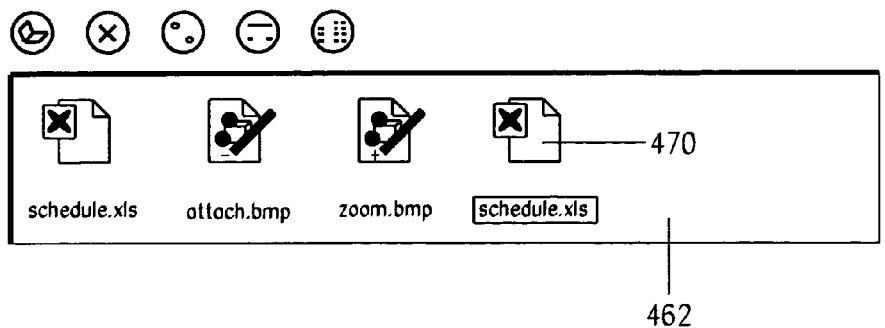

Referring to FIG. 16, in accordance with an exemplary embodiment of the invention, to allow browser 112 users to import interest content into a QuickPlace, HTML conversion module 454, such as an "HTML Export" engine from Verity, is used on the server. Whenever a browser 112, such as Netscape, user imports a file—or when an Internet Explorer user imports a file that is not recognized by the OLE automation code described above, i.e. a non-Office/SmartSuite file—as is represented by line 455, the file is uploaded unmodified to the server. As is represented by line 451, server 100 passes the file onto the Verify engine 454, which will attempt to convert it into HTML. If this is successful, as is represented by line 453, the HTML will then be attached to the QuickPlace page and displayed whenever a user reads this page.

Scenario #8: Netscape User Imports Microsoft Word Document into QuickPlace

The sequence of events that will occur when a Netscape user attempts to import a Microsoft Word document into QuickPlace are as follows:
1. Netscape user creates an imported page in QuickPlace: New . . . , Imported Page.
2. The user selects a Microsoft Word document from the hard drive using the standard HTML "Browse" button and the standard File-Open dialog box.

Previously, every file imported by the user was assumed to be HTML. In accordance with this embodiment of the invention, the user will be able to select any file, as long as it is supported by the conversion engine 454. For example, for a Verity conversion engine, formats that are supported include:

Microsoft Word 97/2000
Microsoft Word 6/95
Microsoft Word 2
Microsoft Word Mac
Microsoft Excel
Microsoft PowerPoint 97/2000
Microsoft PowerPoint 95
Microsoft PowerPoint 4.0
Microsoft Write
Microsoft Rich Text Format
Lotus WordPro
Lotus 123 96/97
Lotus 123 V2-5
Lotus Freelance Graphics 2.x
Lotus Freelance Graphics 96/97
Lotus AmiPro
Corel Quattro Pro Spreadsheet
Corel WordPerfect 5.1
Corel WordPerfect 6.x to 8.x
Windows Bitmap
Icon Files
PNG (Portable Network Graphics)
TIFF 3. User clicks "Next"

At this point, Netscape will automatically upload the selected file to the server. If the user picked a file which is not supported by Verity, a JavaScript error would be displayed.

In addition to uploading the selected file, the "h_command" HTML field is set to a value such as "h_VerityImport"—this will cause the Verity Import command to be executed on the server. This code will then obtain the selected file from the browser's HTTP Post request, save it in the TEMP directory on the server machine, and then call the Verity HTML Export engine.

If the Verity code is able to successfully convert the selected file to HTML, the server attaches the resulting HTML file, and any support image files or other files, to the current Notes document. Finally, the document is published as usual.

If the Verity code 454 is unable to convert the selected file to HTML, a server exception will be thrown, and a helpful error message displayed in the user's Netscape browser 12.

To implement this embodiment of the invention, a new "Haiku Command" ("h_VerityImport") in NINOTES.DLL is implemented to call into Verity 454 when a file is received from the browser 112. This command calls into the Verity C API, passing the uploaded file 451 as a parameter. In addition, some of the HTML import code is copied into the server (NINOTES.DLL) to alter the HTML after it has been created by Verity—fixing up image tags, and adding JavaScript to the HTML to make it function properly inside of QuickPlace.

Scenario #9: Editing a QuickPlace File Attachment: for Example "Schedule .xls"

Referring to FIG. 17 through FIG. 24, in accordance with a preferred embodiment of the invention, editing a QuickPlace file attachment and saving the changes back to QuickPlace will occur as follows:

1. User reads a QuickPlace page which contains 3 file attachments 458, one of which is called "schedule.xls." 456. The file is displayed inside a grayed-out upload control 460. The grayed-out appearance of the upload control 460 reminds the user that this is a read-only copy of the file, and that if the user attempts to modify the file here it will not be possible to save the new version of the file back into QuickPlace.
2. The user edits the QuickPlace page and double clicks on schedule.xls 456, launching Excel 2000, the associated application. This time, in edit mode, the upload control 462 is not grayed out and the user realizes that the file may be edited.
3. The user makes some changes to the file and shuts down Excel 2000. QuickPlace detects that Excel 2000 is no longer running, determines that schedule.xls 456 has been modified and displays dialog box 464. If the user clicks "Yes" 466 the new version of schedule.xls is uploaded to the server and the old version is discarded. However, if the user clicks no 468, an additional file icon 470 appears in the upload control 462. The user must type in a new name for this file—or type "Escape" and cancel the upload operation. Finally, if the user doesn't select a new file name and simply presses "ENTER" an error is displayed.

Tasks

In accordance with a preferred embodiment of the invention, custom field definitions allow a user to create forms in the QP environment without having to write HTML, leaving the generation of the HTML to QuickPlace. A field object may be created at the browser in Java script that contains the properties of the field and the methods which display and operate on that field, including validation. In general, an object is made up of properties and methods. Previously, the HTML was stored with the field definitions. A problem with this procedure is that when it is desired to change the field, it was necessary to upgrade the data in all of the field definition documents. With the present invention, users can now create their own field definitions. The html is generated on the fly, and this facilitates the creation of tasks.

When a new form is created, all fields that go with that form are obtained. A manager can create a form. A page is something that contains data. A form is use to create that data. When anyone creates a page, he is presented a list of possible forms. A manager can request creation of a new form. When a new form is requested, QP shows a form that shows information that is need to create the form. The user fills in that information, and can also click an add field button. QuickPlace responds with a list of the field types that can be created. The user selects and configures the desired field type for each field desired on the form. When the user done adding fields, he clicks "done". Thereafter, when a user clicks new, that new form is displayed as one of the options for user selection.

Previously, it has been very difficult to create new types of fields. In accordance with the present embodiment of the invention, a task page is displayed at the browser together with an edit page and fields for all of the material needed to create a field.

Further in accordance with a preferred embodiment of the invention, a task control section is provided which can be added to any new form, thus enabling task definitions in collaboration space. Task is an option when adding a new field, and this can be customized to include a start date and whether it will have a priority or category, and default value for the priority.

QP client code implements the "on the fly" concept. The code is stored on the server, and sent to the client for the creation of these fields, and the corresponding HTML executes on the client. A page on the server is sent to the client, that page contains the java script which will generate the HTML.

Figure 23:
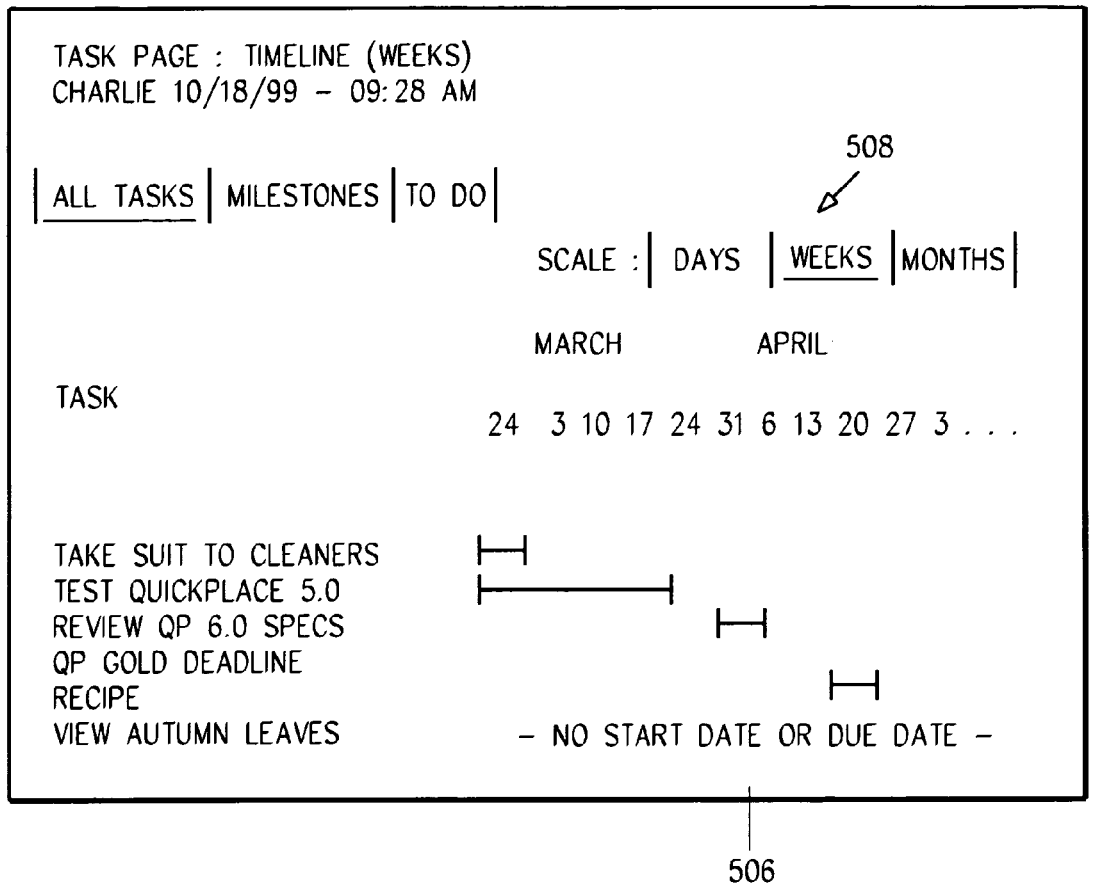
FIG. 23 is a schematic representation of a task page presented in time line mode.

Referring to FIG. 23, in accordance with a preferred embodiment of the invention, users in collaboration space can view a tasks page 506 as a timeline 508, with options for refining the timeline display for the variety of timescales (days, weeks, months, quarters, etc.) that may arise. Also, referring to FIG. 22, tasks page 506 may be presented in list mode, with the user provided buttons 508 for selecting a desired format, and other options 510. FIG. 24 represents a read scene state display for tasks.

Forms Definition in Collaboration Space

In accordance with a preferred embodiment of the invention, users are provided with a method for defining forms to create pages within collaboration space. These methods include options to upload a document and send a notification, add a meeting to the calendar, or add a task into the QuickPlace.

By clicking on New . . . , the user gets a list of forms included in QuickPlace that can be used to add a new document to it. The forms provided are sufficient for many uses, but do not give any task-specific ways of adding content to the QuickPlace. To do this, a user may create her own form and adapt it to her particular needs.

There are three ways to create forms: create a form using standard QuickPlace fields; import a form 250 created in Microsoft Office 228; and import a form 122 created in an HTML editor 124.

In accordance with this embodiment of the invention, when creating a form, it can be adapted to the workflow in the team.

Defining a Type of Workflow

To accomplish a company's goals, certain tasks must be executed, fulfilling a number of activities in a certain order, and doing this within a given time frame. This definition of goals and procedures the workflow of an organization. In accordance with a preferred embodiment of the invention, collaboration space can be adapted to reflect workflow.

Referring to FIG. 25, workflow page 512 provided by QuickPlace enables integration of a form into the organization's workflow. The following options are available from the form workflow page:

No special workflow 514: pages are simply created by an author and published by the member who created the page.

Simple Submit 515: pages are simply created by an author and submitted. This will add a submit button to the button bar at the top of the page.

Editor In Chief 516: pages are created by authors, but pages will only be published after being approved by a specific member—the Editor In Chief.

Approval Cycle 517: each page is routed through a series of members in a specific order.

Multiple Editors 518: pages are created by an author and then, once published, can be further edited by any of the authors in the room.

No Special Workflow

The no special workflow option 514 allows members to publish their pages bases on this form without first getting approval from any other member of the QuickPlace either as a draft or in their final form.

Simple Submit

The simple submit option 515 is chosen when the pages created by this form don't have to undergo review, the users are not able to save pages created by this form as drafts and when it is needed to be able to rename the Publish button. When an author creates a page using this form, the following events happen, assuming that the Simple submit workflow was used to rename the Publish button to Post to Project Milestones button.

1. The author creates the page and clicks on Post to Project Milestones.
2. The page is published to the Project Milestones folder.

Editor in Chief

The editor in chief option 516 is selected when a single member is to review each page created with the form. When an author creates a page that has to be reviewed by an Editor in Chief, the following event occurs:

1. The author finished editing the page and notifies the Editor in Chief that the page is ready for review by clicking on the Submit button. Technically, the author has passed the right to edit the page to the Editor in Chief. Editor-In-Chief Pages are created by authors, but pages will only be published after being approved by a specific member—the Editor-In-Chief.

Upon submitting the page, the author can choose to send the Editor in Chief a note about the page by E-mail. The note only appears in the E-mail message, not on the page itself.

The author can also save the page under construction to continue editing at a later time before submitting it to the Editor in Chief.

2. The Editor in Chief receives an E-mail message containing the author's note (if one has been created) with a link to the new page.

3. The Editor in Chief reviews the pages and does one of the following:

Edits the page (if necessary) and by publishing approves it. The Editor in Chief can select to notify the author that the page has been published.

Rejects the page. The Editor in Chief can choose to attach a note to the rejection message. The author receives an E-mail message saying that either the page has been published or rejected. If the pages has been rejected, the author can revise the page and then resubmits it to the Editor in Chief for approval.

Approval Cycle

The approval cycle option 517 is selected when each page is to be routed through a series of members in a specific order. This workflow option 517 is chosen when the more that one member of the collaboration space is to review pages created with the form. This is similar to the Editor in Chief process 516, only that it includes more that one reviewer.

After choosing approval cycle, which members and in which order to review the document are specified. Restrictions may be set on who may read or edit the final page and the member determined who is responsible for editing the page when it is rejected. By way of example, if an approval cycle 517 is defined with two reviewers, and the folder Project Milestones set as the destination for final approved pages, the following events occur:

1. The author finishes editing the page and notifies the first reviewer that it can be reviewed by clicking the Submit button.
    The author can choose to send a note on the page in an E-mail message to the first reviewer. This note only appears in the E-mail message, not the page itself.
    The author can also choose to save the page under construction to continue editing it at a later time.
2. The first reviewer receives an E-mail notifying him that the page is ready for review. It contains the note from the author (if one was created) and a link to the page awaiting approval. The first reviewer reviews the page and takes one of the two following actions:
    Reads and edits the page (if necessary) and submits it to the next reviewer.
    Rejects the page. The reviewer can choose to create a note to accompany the rejection notice.
3. If the first reviewer rejects the page, the author receives an E-mail notifying him of the rejection. He then can change the page and resubmit it to the first reviewer, repeating the first two steps of this procedure.
4. If the first reviewer approves the page, the second reviewer receives an E-mail with a link to the page awaiting approval and a note from the first reviewer (if one was created). The reviewer takes one of the following actions:
    Reviews, edits (if necessary) and approves the page. The page is then published in the Project Milestones folder.
    Rejects the page. The author receives an E-mail message stating that the page has been rejected. The second reviewer can choose to create a note to accompany the notification.
5. The author receives the notification, corrects the page and resubmits it to the second reviewer, who in turn can then either reject it again or publish it.

Multiple Editors

The multiple editors option 518 is selected when pages are created by an author and then, once published, can be further edited by any other author in the room. This option is chosen when all authors in the QuickPlace are given edit rights to the page created by this form. This is useful if a document has to be viewed by all and all authors may add their thoughts to it. This option is useful for poll forms, as a user edits the page when she casts a vote in the poll. The member has to be an author to take part in the voting.

Creating a Form Using Standard QuickPlace Fields

Figure 21:
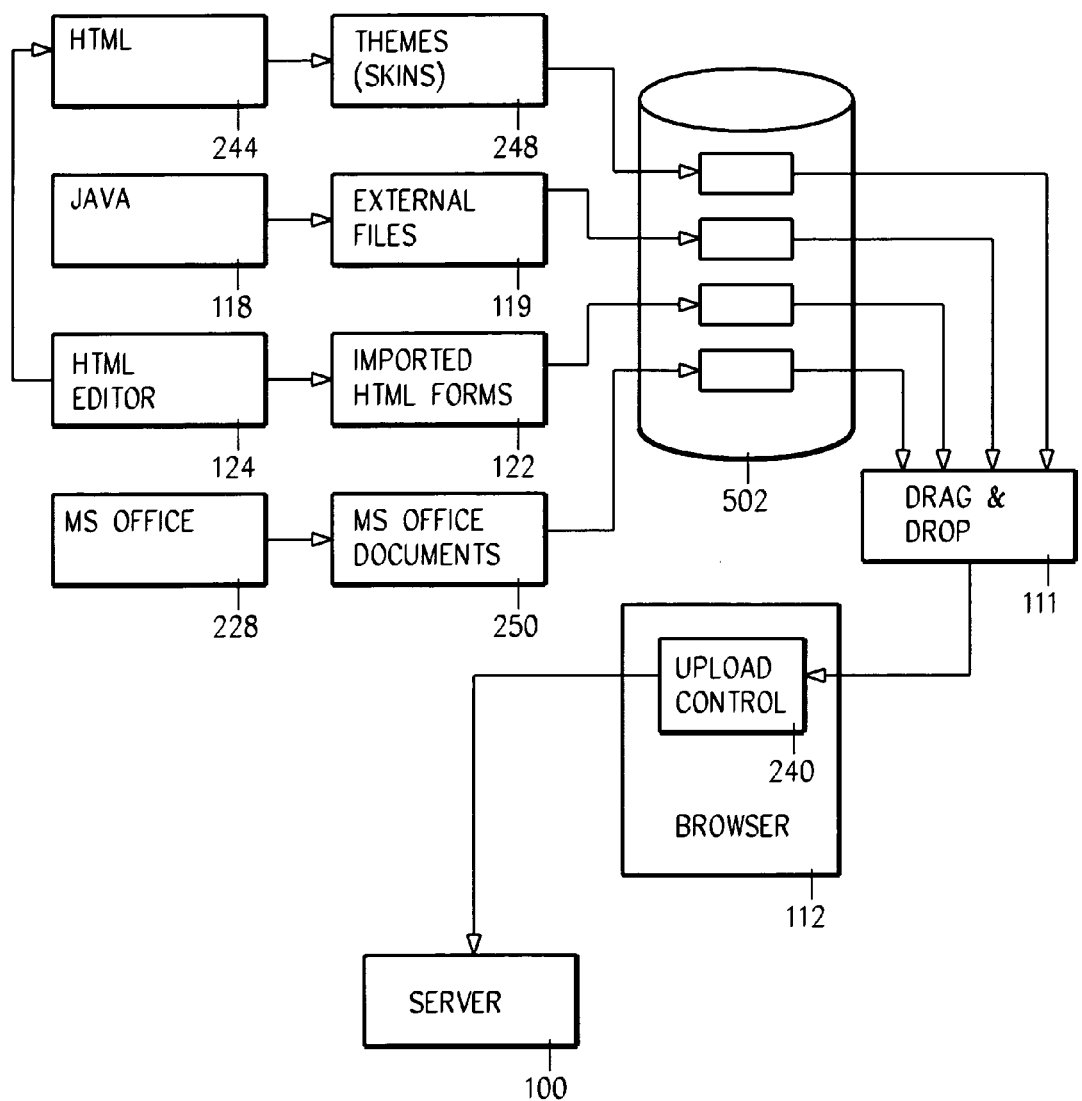
FIG. 21 is a flow chart illustrating the creation and importation into collaboration space of a form.
Figure 22:
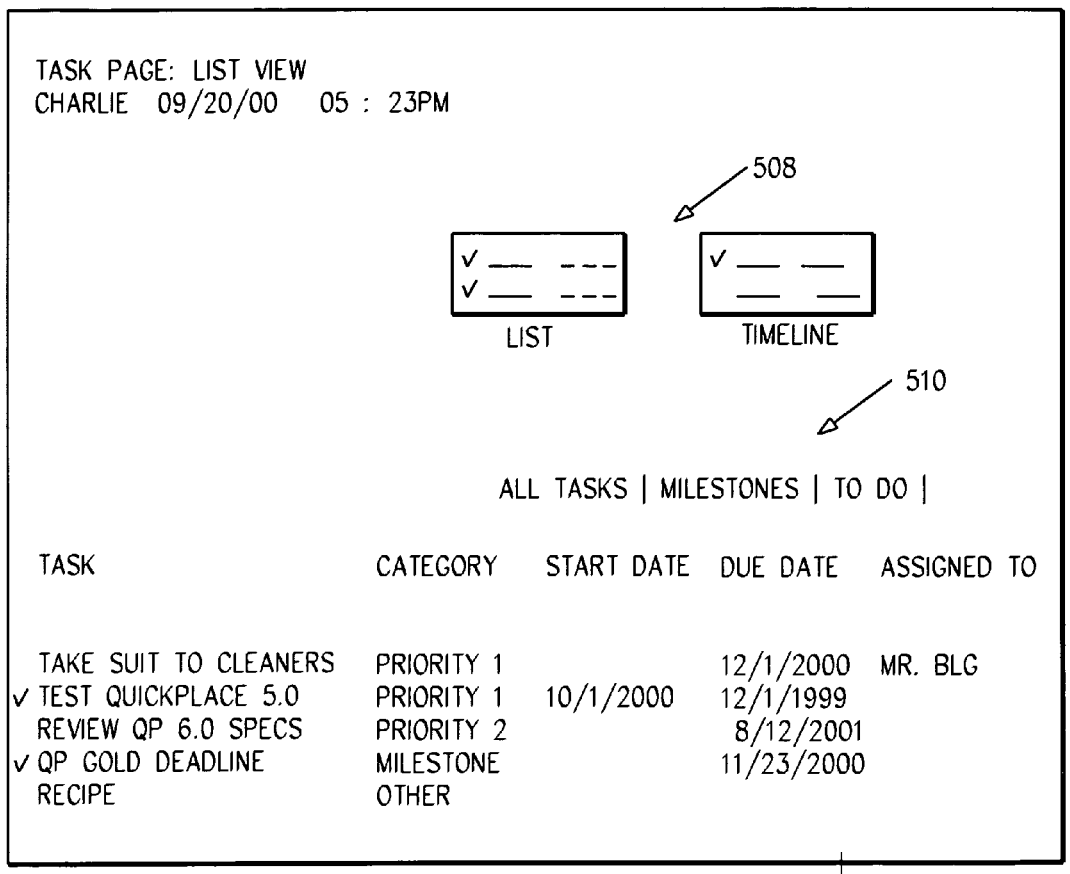
FIG. 22 is a schematic representation of a task page presented in list mode.

Creating a form within QuickPlace may be done in several ways. To generate a simple form with just a couple of fields in it, use the feature within QuickPlace. If designing a form that is more sophisticated, or it is needed to include JavaScript to do checks on fields, for example, the form is created outside of QuickPlace and imported, as illustrated in FIG. 21.

By way of example, suppose users are to be able to add events to the calendar when the page is published, and also have the pages published in a specific folder. To do this, choose customize from the main menu, and click on new form. On the next screen, choose simple form and click on Next. FIG. 26 illustrates the Edit form page 522. Add fields to the form by clicking on Add 520, and select a field. To add the page created by this form to the calendar automatically, choose the field Event date and time. As shown in Table 52, QuickPlace responds providing a choice of standard fields which can be used to create the form. Furthermore, referring to Table 53, there are a number of fields that are non-editable, but provide additional information on the form.

TABLE 52

EDITABLE FIELDS FOR CREATE FIELD

| Field type | Function |
| --- | --- |
| Plain Text | Presents a one-line unformatted text field |
| Text Area | Presents a multi-line unformatted text field |
| Pop-up list | Presents a list of choices from which to choose |
| Time Pop-up | Presents a time pop-up |
| Name Pop-up | Presents a list of QuickPlace members |
| Attachments | Presents a field for adding file attachments |
| Rich Text | Presents a field where the author can enter formatted text and images |
| Calendar Date-Time | Presents a combination of date and time fields so that pages created with this form will automatically be added to this QuickPlace's Calendar |
| Task | Presents a combination of task related fields so that pages created with this form can be tracked as tasks |

TABLE 53

NON-EDITABLE FIELDS FOR CREATE FORM

| Field type | Function |
| --- | --- |
| Notification Indicator | Used to automatically send E-mail to individuals |
| Non-Editable Rich Text | Presents non-editable text and graphics on the form. Typically this is used to provide an attractive banner on top of the form |
| Page Author | Presents the non-editable name of the author who created the page with this form |
| Creation Date | Presents the non-editable date that the page was created |
| Last Modified Date | Presents the non-editable last modification date of the page |
| Page Size | Presents the non-editable size of the page |
| Serial Number | Presents a non-editable unique for each page created with the form (for example, Purchase Order Number) |

Selecting a field type brings up on the screen the instructions for adding to the field to the form being developed. If the pages created by this form are to be published in a specific folder, the folder is chosen from a drop-down list. As an option, a fuller description of what the form does can be added. This description appears next to the name of the form when the user clicks on New . . . .

Setting Tasks

Besides choosing a type of workflow for forms created in a QuickPlace, task settings may be chosen on the pages that are created using the form and adding them to the Tasks list in the QuickPlace. To do this, add the field Task from the Add Field page and click Next. The following page provides a way to name the task field, set a start date and the priority for the task, and set the initial choice for the priority. When finished adding fields to the form, clicking on Done saves the form.

Authors can create pages based on the form by clicking New . . . in the button bar and selecting the form from the page which appears next.

Upload a Form Created in MS Office

If the form requires some fields that are not part of the QuickPlace form creation applet, a form can be created either in MS Office 228 or in an HTML editor 124. To use MS office 228, create a new Word document, and add web form fields, such as by clicking on the appropriate field icon in a Microsoft Word web tools toolbar. Save the document as a Word file 250 when finished. QuickPlace will automatically convert the document to HTML when it is imported.

The web tools toolbar in Word offers eleven standard fields to use in a document: Checkbox control, Option or Radio button control, Drop Down box control, Listbox control, Textbox control, Text Area control, Submit control, Submit with Image control, Reset control, Hidden control, and Password control.

By selecting control and clicking on Properties, an HTML name and value can be assigned to the field.

ActiveX Controls

Figure 27:
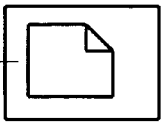
FIG. 27 is a schematic representation of a user interface including upload control.

ActiveX controls, supported by Internet Explorer, may also be added from the control toolbox and clicking on Properties. The following ActiveX controls are available from the tool box: Check box, Spin button, Scroll bar, Label, Text box, Command button, Option or Radio button, List box, Combo box, Toggle button, Image. Additional ActiveX controls can be registered by clicking on More Controls and registering the ones needed. When finished editing the document, it is saved as a MS Word document 250 and upload it to the QuickPlace. To upload, click on Customize and select Form. On the next page, click on New form, and select Microsoft Office form, then click on Next. Referring to FIG. 27, this next page is shown. The MS Word document can by uploaded by dragging and dropping it into the bucket (upload control 240), or selected by clicking on Browse 524. A workflow option can be selected from list 526. To change the standard Publish button for the form, select Workflow 526 and choose Simple submit 515. This will add a submit button into the button bar at the top of form when it is filled in. Click on Next and provide a name 528 for the submit control on the next page. Click on Next. Select the folder the pages are to be published in from the drop-down list 444. Add a short description of the form, if desire, at field 446. Clicking on Done will publish the form to the QuickPlace.

Authors can publish pages by selecting New . . . from the button bar and selecting the form created from the list.

Upload a Manually Created HTML Form

If more control over how the form appears in the QuickPlace, or if JavaScript must be included, the form is created using an HTML editor 124.

The following two examples illustrate how this is to be done. When creating an HTML form manually in an HTML editor 124:

(1) Put all code, including any JavaScript, within the <body> tag of the document. All other parts of the document, that is, the <head> and <title> tags, will be replaced by custom QuickPlace tags once the form is uploaded.

(2) The form tags <form> and </form> are not needed within the manually created HTML form. QuickPlace will add custom code when the form is uploaded.

(3) QuickPlace system fields can be used in the form. In the following examples, the name of the page is set in a text field named h_Name, which is the system field for the page title.

Use QuickPlace Controls in the Form

QuickPlace provides two client-side components for users to quickly interact with the QuickPlace, the Rich text and the Upload control. Authors can format their text in the Rich text control, giving it a personal look and feel. They can upload documents to the QuickPlace by dragging and dropping 111 them into the Upload control 240. These controls only have their full functionality in Internet Explorer. Both are ActiveX controls in Internet Explorer. Calling a form with the Rich text control included starts a Java applet in Netscape Navigator. The Upload control displays a browse button in Netscape Navigator. The author then can select a file from his computer when he or she clicks on it.

Both browsers display the formatted Rich text in read mode and load the appropriate client-side component when changing into edit mode. Internet Explorer lets the user drag a document out of the Upload control box 240 to download or view the document, whereas Netscape Navigator displays a link the user can click on to download or view the file. The forms provided by QuickPlace use these controls, and they can be include new forms.

The QuickPlace Upload Control Example

The example form of Table 54 creates a page that includes the QuickPlace control to upload files to the QuickPlace. It also includes some fields for the user to fill in to provide information about the attached file. The <body> tag contains the complete form, and the <form> tags are omitted from the HTML page. Adding fields begins right after the <body> tag. Standard HTML fields can be used in the form, and this examples shows use of text fields, a text area and a drop-down field.

TABLE 54

PAGE UPLOAD CONTROL

```
<html>
<head>
<title>Upload control</title>
</head>
<body>
<table border=0>
<tr>
<td colspan=3><img src="ecblank.gif" width="300" height="1" border="0">
<tr>
<td><b>Document Title</b></td>
<td> </td>
<td><b><input type="text" name="h_Name"></b></td>
</tr>
<tr>
<td>Your first name</td>
<td> </td>
<td><input type="text" name="fname"></td>
```

TABLE 54-continued

PAGE UPLOAD CONTROL

```
</tr>
<tr>
    <td>Your last name</td>
    <td> </td>
    <td><input type="text" name="lname"</td>
</tr>
<tr>
    <td>Company</td>
    <td>  </td>
    <td>
    <select name="selector">
    <option value="-- choose one --">----choose one
    ----</option>
    <option value="Millenia">Millenia</option>
    <option value="TheRock">TheRock</option>
    <option value="CapMan">CapMan</option>
    </select>
    </td>
</tr>
(CON'T.):
    <tr>
    <td valign="top">Give a short description<br>of your
    file</td>
    <td> </td>
    <td><textarea name="description" rows=5
    cols=50></textarea></td>
    </tr>
    <tr>
    <td valign="top">place your file here</td>
    <td> </td>
    <td valign="top"><QuickPlaceCONTROL type="attachment"
    name="attachment"></td>
    </tr>
    </table>
    </body>
    </html>
```

In the continuation of Table 54, the QuickPlace component for the Upload control is included. In Internet Explorer, this tag will include the ActiveX Upload control in the page, and a browse button in Netscape Navigator. In the published page, the button converts to a link to the page in Netscape Navigator, while the Internet Explorer displays the ActiveX Upload control.

TABLE 54 (CON'T.)

PAGE UPLOAD CONTROL

```
    <tr>
    <td valign="top">Give a short description<br>of your
    file</td>
    <td> </td>
    <td><textarea name="description" rows=5
    cols=50></textarea></td>
    </tr>
    <tr>
    <td valign="top">place your file here</td>
    <td> </td>
    <td valign="top"><QuickPlaceCONTROL type="attachment"
    name="attachment"></td>
    </tr>
    </table>
    </body>
    </html>
```

The QuickPlace Upload control can be used in any manually created HTML form 122.

The QuickPlace Rich Text Control

The example form of Table 55 creates a page that includes the QuickPlace Rich text control to add Rich text and graphic text to the page. Rich text is formatted by adding the appropriate HTML tag around it. To display the graphic text, QuickPlace uses its built-in graphics server. The <body> tag contains the complete form, and the <form> tags are omitted from the HTML page. Fields are added right after the <body> tag. Standard HTML fields can be used for the form, this example uses text fields and a drop-down field.

TABLE 55

QuickPlace RICH TEXT CONTROL EXAMPLE

```
<html>
<head>
<title>Upload contdol</title>
</head>
<body>
<table>
<tr>
<td colspan="3"><IMG src="ecblank.gif" height="5" width="200"
border="0"></td>
</tr>
<tr>
    <td><b>Document Title</b></td>
    <td>  </td>
    <td><b><input type="text" name="h_Name"></b></td>
</tr>
<tr>
    <td>Your first name</td>
    <td>  </td>
    <td><input type="text" name="fname"</td>
</tr>
<tr>
    <td>Your last name</td>
    <td> </td>
    <td><input type="text" name="lname"</td>
</tr>
<tr>
    <td>Company</td>
    <td>  </td>
    <td>
    <select name="selector">
    <option value="-- choose one --">----choose one
    ----</option>
    <option value="Millenia">Millenia</option>
    <option value="TheRock">TheRock</option>
    <option value="CapMan">CapMan</option>
    </select>
    </ td>
</tr>
(CON'T.):
    <tr>
    <td valign="top"> </td>
<tr>
    <td>  </td>
    <td>  </td>
    <td><QUICKPLACECONTROL type= "richtext"
    name="richtext"<>/td
</tr>
</table>
</body>
</html>
```

In the continuation of Table 55, the QuickPlace component is included for the Rich text control. In Internet Explorer, this tag will include the ActiveX Upload control in the new page, and a Java applet in Netscape Navigator. Both browsers display the Rich text within the relevant HTML tag. To display the graphic text, QuickPlace uses Limerick in both browsers.

TABLE 55 (CON'T.)

QuickPlace RICH TEXT CONTROL EXAMPLE

```
    <tr>
        <td valign="top"> </td>
    <tr>
        <td> </td>
        <td> </td>
        <td><QUICKPLACECONTROL type= "richtext"
        name="richtext"<>/td
    </tr>
    </table>
    </body>
    </html>
```

QuickPlace Specific JavaScript Functions

Two QuickPlace specific JavaScript functions to use with forms exist in QuickPlace. They are event handlers that can be called when the form is loaded from or a page created by the form is submitted to the QuickPlace.

QDK_HTML_FormOnLoadHandlerCallback (theForm)

This JavaScript function is called when the form loaded from the QuickPlace. It can, for example, set certain default field values. The example of Table 56 sets the expiration date for a page created with this form to two months.

TABLE 56

FORM ON LOAD HANDLER

```
function QDK_HTMLForm_OnLoadHandlerCallback( theForm)
{
if ( h_IsNewDoc == '1') {
var now = new Date( );
now.setMonth( now.getMonth( ) + 2);
var expirationDate = now.toLocaleString( );
expirationDate = expirationDate.substr( 0,
expirationDate.indexOf ( '
'));
theForm.expires.value = expirationDate;
}
theForm.h_Name.focus( );
}
QDK_HTML_FormOnSubmitHandlerCallback ( theForm)
```

The JavaScript function of Table 57 is called when the form is loaded from the QuickPlace. It can, for example, check if the user has entered data into fields that have to be filled. This example checks if a proper E-mail address has been entered by checking for the @ symbol and a dot in the string following it:

TABLE 57

HANDLER CALL BACK

```
function QDK_HTMLForm_OnSubmitHandlerCallback( theForm)
{
var isOk = false;
if ( theForm.email.value.indexOf( '@') > 0 &&
theForm.email.value.indexOf( '.') > 2) {
isOk = true;
}
else {
alert( 'Please enter a valid email address');
}
return isOk;
}
```

These functions are very handy to perform checks or changes while loading forms or publishing pages based on forms. They can be adapted to perform whatever check is needed for a forms.

Advantages Over the Prior Art

It is an advantage of the invention that there is provided a collaboration space application model for creating web applications that are aesthetically pleasing and present the user with a simple interface.

It is an advantage of the invention that there is provided a method and system for creating web applications that are instantly created, instantly archived, team and project oriented, easy to use, created, accessed and administered via the Web, reusable, and extensible.

It is an advantage of the invention that there is provided an improved method and system for designers and consultants to incorporate into collaboration space custom features and data from other applications.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, PI/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for integrating forms including fields defining the schema of a collaboration space into said collaboration space, comprising the steps of:
    creating a form containing fields defining said schema and hyperlinks that point to web pages;
    saving said form to local storage at said browser;
    dragging and dropping said form from local storage into an upload control panel in a user interface to said collaboration space;
    parsing said form to identify said fields and incorporate them into said schema;
    integrating said form into said collaboration space;
    rendering said form to a user;
    receiving said form from said user with new data content for said collaboration space; and
    said collaboration space being implemented within an object model consisting of place, room, folder, page, member, form, field, placetype, roomtype, skin, and placebot objects.

2. The method of claim 1, with said room object visible as a unique identifier in uniform resource locators (urls).

3. The method of claim 1, further comprising the step of using said field object to construct html formatted input fields in forms.

4. The method of claim 1, further comprising the step of defining said form object using said form including imported hyperlinks.

* * * * *